United States Patent
Hyun et al.

(10) Patent No.: US 10,230,916 B2
(45) Date of Patent: Mar. 12, 2019

(54) REMOTE CONTROL APPARATUS, METHOD FOR CONTROLLING THEREOF, AND DISPLAY SYSTEM

(71) Applicant: SAMSUNG ELECTRONICS CO., LTD., Suwon-si (KR)

(72) Inventors: Sang-min Hyun, Seoul (KR); Sung-hyuk Kwon, Suwon-si (KR); Jin-woo Ro, Seoul (KR); Won-jun Lee, Seoul (KR); Bum-ho Chun, Yongin-si (KR); So-young Jung, Incheon (KR); Jeong-hye Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/388,782

(22) Filed: Dec. 22, 2016

(65) Prior Publication Data
US 2017/0180673 A1    Jun. 22, 2017

(30) Foreign Application Priority Data
Dec. 22, 2015 (KR) .................. 10-2015-0183929

(51) Int. Cl.
*H04N 5/44* (2011.01)
*G06F 3/0485* (2013.01)
(Continued)

(52) U.S. Cl.
CPC ......... *H04N 5/4403* (2013.01); *G06F 3/0362* (2013.01); *G06F 3/0485* (2013.01);
(Continued)

(58) Field of Classification Search
CPC ............ H04N 5/4403; H04N 5/44543; H04N 5/44582; H04N 2005/4412;
(Continued)

(56) References Cited

U.S. PATENT DOCUMENTS

| 7,979,879 | B2 * | 7/2011 | Kazama | G06F 3/04815 345/418 |
|---|---|---|---|---|
| 2002/0057893 | A1 * | 5/2002 | Wood | H04N 5/4401 386/355 |
| 2003/0083533 | A1 * | 5/2003 | Gerba | G06F 3/04815 585/367 |

(Continued)

FOREIGN PATENT DOCUMENTS

| KR | 10-0643306 B1 | 11/2006 |
|---|---|---|
| KR | 10-2008-0016283 A | 2/2008 |

(Continued)

*Primary Examiner* — Stephen G Sherman
(74) *Attorney, Agent, or Firm* — Sughrue Mion, PLLC

(57) ABSTRACT

A remote control apparatus is provided, which includes a communicator configured to perform communication with a display apparatus, a first input including a plurality of direction keys, a second input disposed on an edge of the first input and including a plurality of keys corresponding to the plurality of direction keys, and a processor configured to transmit to the display apparatus a first control command to perform a function corresponding to a first direction and a first unit in response to selection of a first direction key among the plurality of direction keys of the first input, and transmit to the display apparatus a second control command to perform a function corresponding to the first direction and a second unit greater than the first unit in response to selection of a key corresponding to the first direction key among the plurality of keys of the second input.

18 Claims, 20 Drawing Sheets

(51) Int. Cl.
*H04N 5/445* (2011.01)
*G06F 3/0362* (2013.01)

(52) U.S. Cl.
CPC ..... *H04N 5/44543* (2013.01); *H04N 5/44582* (2013.01); *H04N 2005/443* (2013.01); *H04N 2005/4407* (2013.01); *H04N 2005/4412* (2013.01)

(58) Field of Classification Search
CPC ...... H04N 2005/443; H04N 2005/4407; G06F 3/0482; G06F 3/0485
USPC ........................................................ 345/157
See application file for complete search history.

(56) References Cited

U.S. PATENT DOCUMENTS

| | | | | |
|---|---|---|---|---|
| 2003/0095096 | A1* | 5/2003 | Robbin | G06F 1/1626 345/156 |
| 2006/0263046 | A1* | 11/2006 | Saito | H04N 5/76 386/285 |
| 2006/0279541 | A1 | 12/2006 | Kim et al. | |
| 2007/0229472 | A1 | 10/2007 | Bytheway | |
| 2008/0062127 | A1* | 3/2008 | Brodersen | G06F 3/0482 345/158 |
| 2010/0090968 | A1 | 4/2010 | Lee et al. | |

FOREIGN PATENT DOCUMENTS

| | | |
|---|---|---|
| KR | 10-2008-0029500 A | 4/2008 |
| KR | 10-2013-0114413 A | 10/2013 |
| KR | 10-2015-0014590 A | 2/2015 |

\* cited by examiner

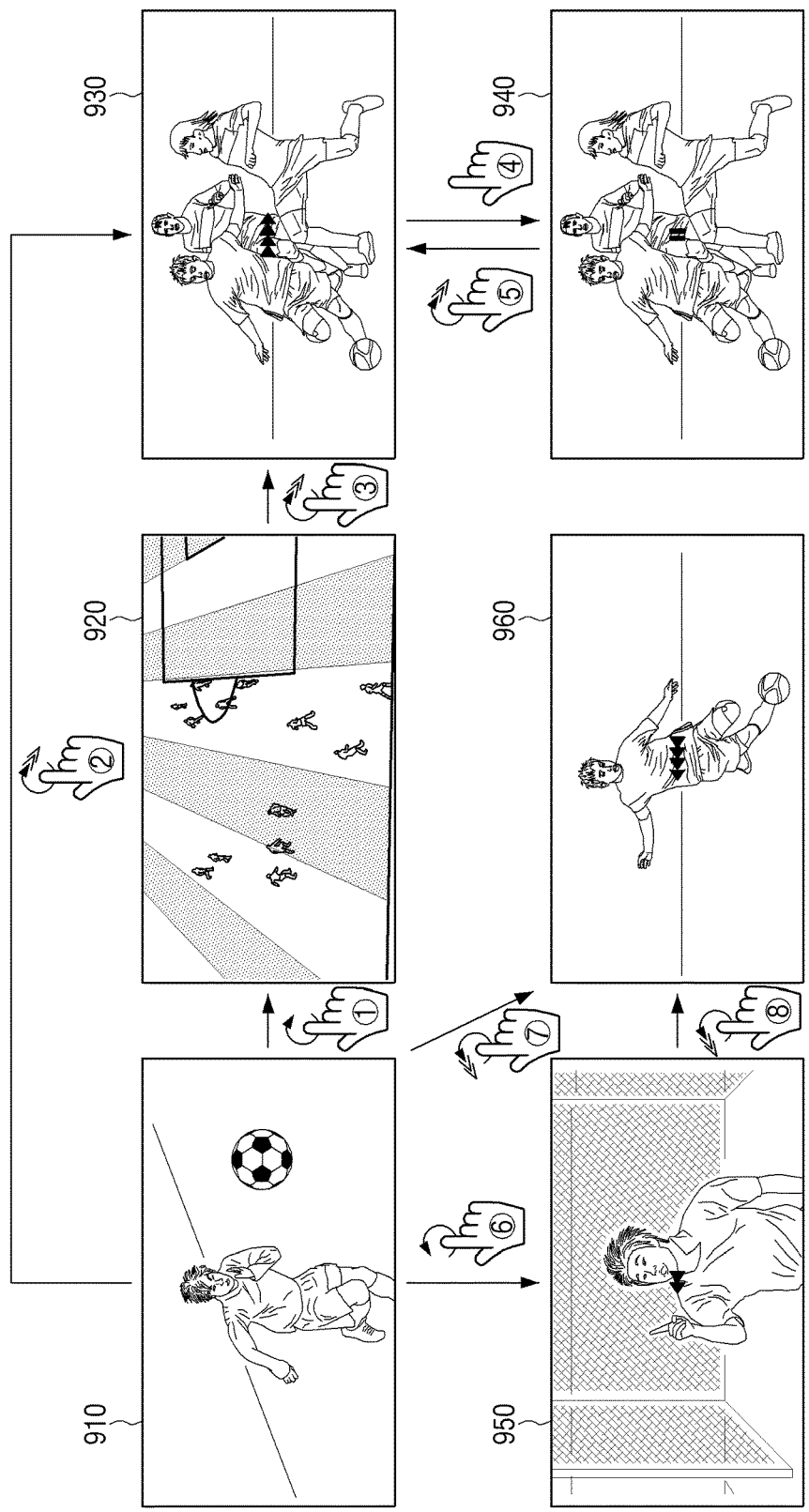

REMOTE CONTROL APPARATUS, METHOD FOR CONTROLLING THEREOF, AND DISPLAY SYSTEM

CROSS-REFERENCE TO RELATED APPLICATIONS

This application claims priority from Korean Patent Application No. 10-2015-0183929, filed on Dec. 22, 2015 in the Korean Intellectual Property Office, the disclosure of which is incorporated herein by reference in its entirety.

BACKGROUND

1. Field

Apparatuses, methods and systems consistent with the present disclosure relate to a remote control apparatus, a method for controlling thereof, and a display system, and more particularly, to a remote control apparatus with enhanced user operating convenience, a method for controlling thereof, and a display system.

2. Description of the Related Art

For an interface between a display apparatus and a user, panel keys on the display apparatus or a remote control apparatus such as a remote controller have been in use.

Meanwhile, technologies have advanced, and functionalities of display apparatuses have been complicated and diversified to the extent that they can play the contents such as downloaded videos or browsing the Internet.

Specifically, increasingly complicated and diversified UIs provided by the display apparatus have led into use of a variety of keys on a remote controller to move a cursor in the UIs to control a time of playing content, and so on.

However, because these keys are not grouped by associated functionalities, the user is confused as to which key of the remote controller corresponds to which display operation of the display apparatus.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide a remote control apparatus with enhanced user operating convenience, a method for controlling thereof, and a display system.

In an exemplary embodiment of the present disclosure, a remote control apparatus is provided, which may include a communicator configured to perform communication with a display apparatus, a first input comprising a plurality of direction keys, a second input disposed on an edge of the first input and comprising a plurality of keys corresponding to the plurality of direction keys, and a processor configured to transmit to the display apparatus a first control command to perform a function corresponding to a first direction and a first unit in response to selection of a first direction key among the plurality of direction keys of the first input, and transmit to the display apparatus a second control command to perform a function corresponding to the first direction and a second unit greater than the first unit in response to selection of a key corresponding to the first direction key among the plurality of keys of the second input.

When an item list is being displayed on the display apparatus, the first control command may be a control command to search the item list in the first direction by an item unit, and the second control command may be a control command to search the item list in the first direction and by a page unit including a plurality of items.

When a content is being played on the display apparatus, the first control command may be a control command to skip the content in a play direction corresponding to the first direction by a first time unit, and the second control command may be a control command to skip the content in a play direction corresponding to the first direction and a second time unit greater than the first time unit.

Meanwhile, when a scrollable object is being displayed on the display apparatus, the first control command may be a control command to scroll the object in the first direction by a first length unit, and the second control command may be a control command to scroll the object in the first direction and by a second length unit greater than the first length unit.

Meanwhile, the first input may be disposed inside an area where the second input is disposed, and the plurality of direction keys may be disposed at a location corresponding to a location of the plurality of keys.

Meanwhile, the second input may receive a rotation input, and a press input corresponding to the plurality of keys, and the processor may control the communicator to transmit to the display apparatus a third control command to perform a function corresponding to a direction of rotation of the rotation input received through the second input.

In the above example, when a content is being played on the display apparatus, the third control command may be a control command to move a time of playing content forward or backward according to the direction of rotation of the received rotation input.

In the above example, when a reception of the rotation input is stopped, the processor may control the communicator to transmit to the display apparatus a control command to temporarily pause playing the content.

Meanwhile, when an item list is being displayed on the display apparatus, the third control command may be a control command to search the item list in a direction corresponding to the direction of rotation of the received rotation input.

Meanwhile, when a scrollable object is being displayed on the display apparatus, the third control command may be a control command to scroll the object in a direction corresponding to the direction of rotation of the received rotation input.

Meanwhile, the second input may be formed as a touchpad or a rotatable member.

Meanwhile, according to an exemplary embodiment of the present disclosure, a method for controlling of a remote control apparatus is provided, in which the remote control apparatus includes a first input comprising a plurality of direction keys, and a second input disposed on an edge of the first input and comprising a plurality of keys corresponding to the plurality of direction keys. The method for controlling may include selecting any of the plurality of direction keys of the first input, or any of the plurality of keys of the second input, and in response to selection of a first direction key among the plurality of direction keys of the first input, transmitting to a display apparatus a first control command to perform a function corresponding to a first direction and a first unit, and in response to selection of a key corresponding to the first direction key among the plurality of keys of the second input, transmitting to the display apparatus a second control command to perform a function corresponding to the first direction and a second unit greater than the first unit.

In the above example, when an item list is being displayed on the display apparatus, the first control command may be a control command to search the item list in the first direction by an item unit, and the second control command may be a control command to search the item list in the first direction and by a page unit including a plurality of items.

Meanwhile, when a content is being played on the display apparatus, the first control command may be a control command to skip the content in a play direction corresponding to the first direction by a first time unit, and the second control command may be a control command to skip the content in a play direction corresponding to the first direction and a second time unit greater than the first time unit.

Meanwhile, when a scrollable object is being displayed on the display apparatus, the first control command may be a control command to scroll the object in the first direction by a first length unit, and the second control command may be a control command to scroll the object in the first direction and by a second length unit greater than the first length unit.

In the above example, the method may additionally include receiving a rotation input through the second input, and transmitting to the display apparatus a third control command to perform a function corresponding to a direction of rotation of the received rotation input.

Meanwhile, when a content is being played on the display apparatus, the third control command may be a control command to move a time of playing content forward or backward according to the direction of rotation of the received rotation input.

In the above example, when a reception of the rotation input is stopped, the method may additionally include transmitting to the display apparatus a control command to temporarily pause playing the content.

Meanwhile, when an item list is being displayed on the display apparatus, the third control command may be a control command to search the item list in a direction corresponding to the direction of rotation of the received rotation input.

Meanwhile, according to an exemplary embodiment of the present disclosure, a display system is provided, which may include a remote control apparatus including a first input comprising a plurality of direction keys, and a second input disposed on an edge of the first input and comprising a plurality of keys corresponding to the plurality of direction keys, and a display apparatus configured to perform a display operation corresponding to a first direction and a first unit in response to selection of a first direction key among the plurality of direction keys of the first input, and perform a display operation corresponding to the first direction and a second unit greater than the first unit in response to selection of a key corresponding to the first direction key among the plurality of keys of the second input.

BRIEF DESCRIPTION OF THE DRAWINGS

The above and/or other aspects of the present inventive concept will be more apparent by describing certain exemplary embodiments of the present inventive concept with reference to the accompanying drawings.

FIGS. 6A to 10 are views provided to explain controlling a display apparatus by a remote control apparatus according to a variety of exemplary embodiments of the present disclosure;

DETAILED DESCRIPTION OF EXEMPLARY EMBODIMENTS

Figure 1:
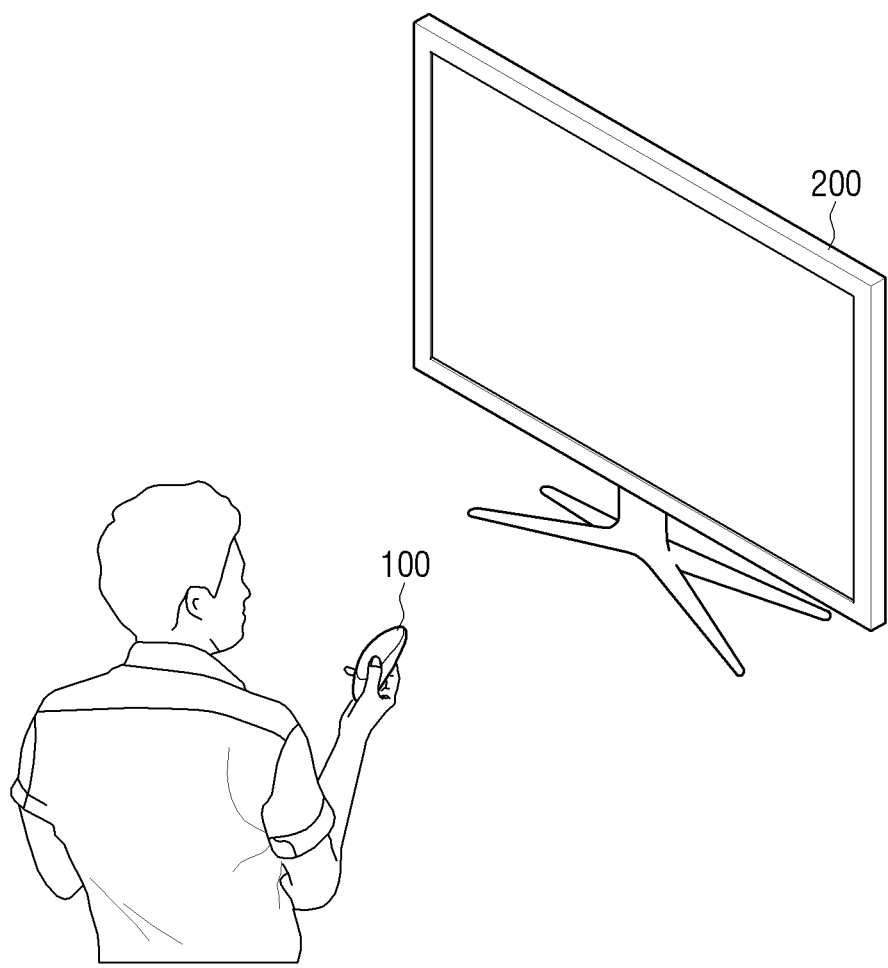
FIG. 1 illustrates a display system according to an exemplary embodiment of the present disclosure.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

In the embodiments of the present disclosure, a 'module' or 'unit' performs at least one function or operation, and may be realized as hardware or software, or a combination thereof. Furthermore, a plurality of 'modules' or a plurality of 'units' may be integrated into at least one module and be realized as at least one processor (not illustrated) except for when they need to be realized as a certain hardware.

Hereinbelow, the present disclosure will be explained in more detail with reference to the drawings attached.

FIG. 1 illustrates a display system 1000 according to an exemplary embodiment of the present disclosure.

Referring to FIG. 1, the display system 1000 includes a remote control apparatus 100 and a display apparatus 200.

The remote control apparatus 100 is configured to control an operation of the display apparatus 200 by transmitting a control command to the display apparatus 200. While FIG. 1 illustrates the remote control apparatus 100 implemented as a general remote controller, exemplary embodiments are not limited thereto. Accordingly, the remote control apparatus 100 may be implemented as a variety of forms including smartphone, wearable device, and so on.

Specifically, the remote control apparatus 100 includes a first input including a plurality of direction keys, and a second input including a plurality of keys corresponding to a plurality of direction keys. A control command corresponding to a specific direction key of the first input and a control command corresponding to a key of the second input may have identical properties, but have difference in the control units.

For example, when a control command corresponding to a first direction key of the first input is a control command to skip the content playing on the display apparatus 200 10 seconds later, a control command corresponding to a key of the second input corresponding to the first direction key may be a control command to skip the content playing on the display apparatus 200 60 seconds later.

Such first input and second input may be adjacently disposed on the remote control apparatus 100 at corresponding locations to each other to enhance convenience of a user operating the same. The arrangement of the first input and the second input will be described in greater detail below with reference to FIGS. 3 to 5.

The display apparatus 200 can display a variety of screens. Although FIG. 1 illustrates the display apparatus 200 implemented as TV, exemplary embodiments are not limited to any specific example. Accordingly, the display apparatus 200 may be implemented as a variety of devices such as monitor, laptop PC, tablet PC, projector, electronic frame, smart phone, and so on, that can perform display function.

Specifically, the display apparatus 200 may perform a variety of operations based on the control commands received from the remote control apparatus 100. For example, as described above, the display apparatus 200 may skip playing the currently-playing content to 10 seconds later, or skip playing it to 60 seconds later, according to a control command from the remote control apparatus 100.

Hereinbelow, the remote control apparatus 100 and the display apparatus 200 will be described in more detail.

Figure 2:
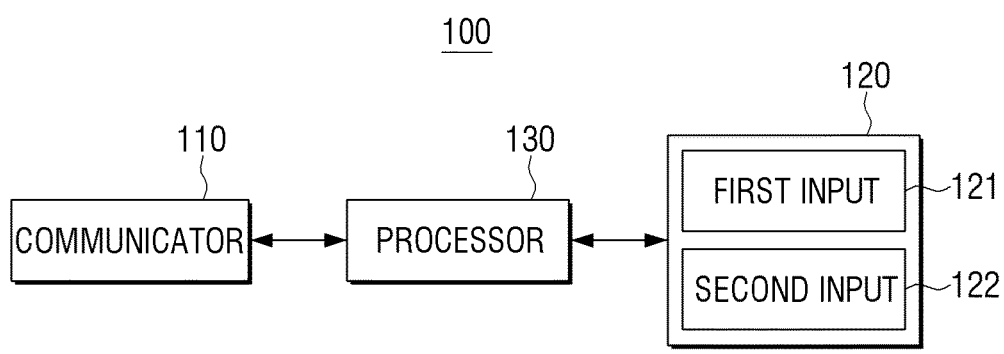
FIG. 2 is a block diagram provided to explain a configuration of a remote control apparatus according to an exemplary embodiment of the present disclosure.

FIG. 2 is a block diagram provided to explain the remote control apparatus 100 according to an exemplary embodiment of the present disclosure.

Referring to FIG. 2, the remote control apparatus 100 includes a communicator 110, an input 120, and a processor 130. The remote control apparatus 100 may be implemented as a variety of devices including remote controller, wearable device, smart watch, smart phone, mouse, and so on.

For example, the communicator 110 may include a wireless communication module and perform a wireless communication function with an external device. For example, the communicator 100 may communicate with the display apparatus 200 with infrared (IR) communication, Bluetooth (BT) communication, WiFi communication, Zigbee communication, and so on.

Specifically, the communicator 110 may transmit a control command to remotely control the display apparatus 200 to the display apparatus 200.

The input 120 is configured to receive a variety of inputs from the user. Specifically, the input 120 includes a first input 121 and a second input 122. The configuration of the input 120 will be described in more detail below with reference to FIGS. 3 to 5.

Figure 3:
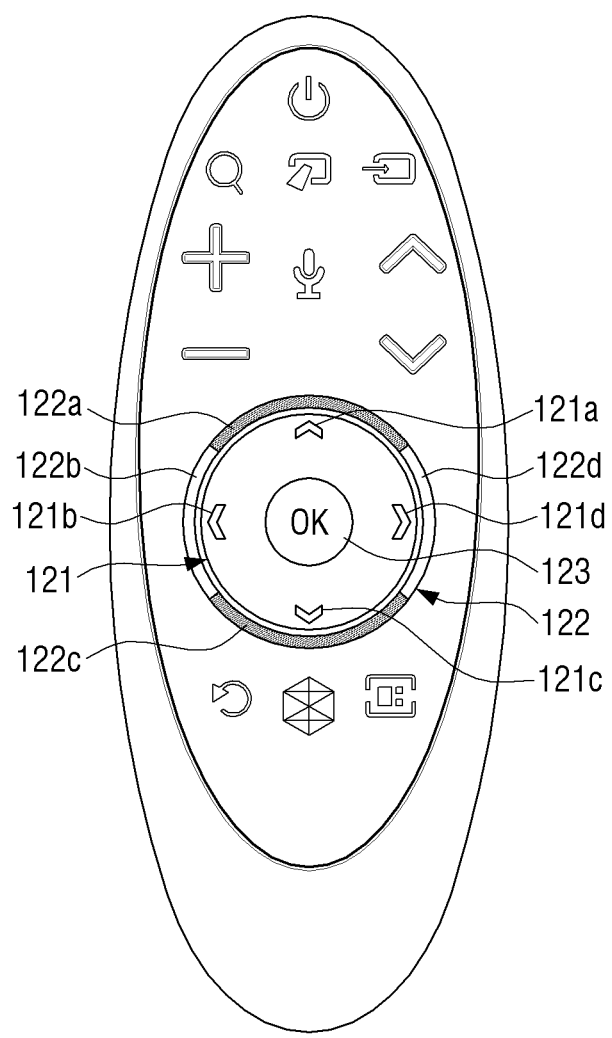
FIGS. 3 to 5 are vies provided to explain an input of a remote control apparatus according to a variety of exemplary embodiments of the present disclosure.

FIG. 3 illustrates a remote control apparatus 100 according to an exemplary embodiment of the present disclosure.

Referring to FIG. 3, the remote control apparatus 100 includes a first input 121 and a second input 122. Additionally, the remote control apparatus 100 may include a variety of input configurations that can be provided on a general remote controller, such as a select key 123, a power ON/OFF key, a volume adjustment key, a channel adjustment key, an execution cancel key, a home screen key, and so on.

The first input 121 includes first to fourth direction keys 121*a*-121*d*, and the second input 122 includes first to fourth keys 122*a*-122*d*.

As illustrated in FIG. 3, the second input 122 is disposed on an edge of the first input 121. Also as illustrated in FIG. 3, the first to fourth direction keys 121*a*-121*d* are disposed at locations corresponding to the locations of the first to fourth keys 122*a*-122*d* of the second input 122.

According to an exemplary embodiment, the first to fourth keys 122*a*-122*d* are disposed around the select key 123 on left, right, upper and lower sides. The first to fourth keys 122*a*-122*d* are disposed around the select keys 123 on the left, right, upper and lower sides, and more specifically, the first key 122*a* is disposed at a location corresponding to the location of the first direction key 121*a*, the second key 122*b* is disposed at a location corresponding to the location of the second direction key 121*b*, the third key 122*c* is disposed at a location corresponding to the location of the third direction key 121*c*, and the fourth key 122*d* is disposed at a location corresponding to the location of the fourth direction key 121*d*.

The first to fourth direction keys 121*a*-121*d* and the first to fourth keys 122*a*-122*d* may be implemented as physical buttons or soft buttons (touch panel) that can receive press inputs.

Further, the first to fourth direction keys 121*a*-121*d* may each be physically divided or formed in connected configurations. Likewise, the first to fourth keys 122*a*-122*d* may each be physically divided or formed in connected configurations.

Meanwhile, the second input 122 including the first to fourth keys 122*a*-122*d* may be able to receive the press inputs to the first to fourth keys 122*a*-122*d*, and also formed as a touchpad or rotatable member to receive rotation inputs.

Figure 4:
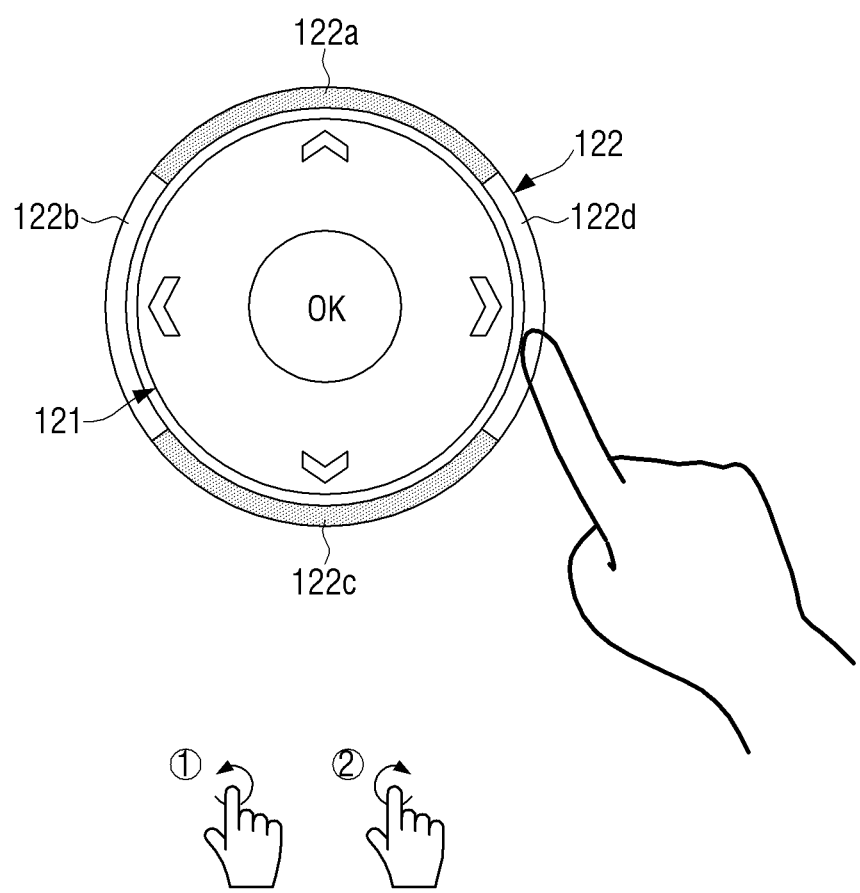

FIG. 4 illustrates the second input 122 formed as a touch panel. FIG. 4 illustrates only the first input 121 and the second input 122 of the remote control apparatus 100 for convenience of explanation.

Referring to FIG. 4, the user may touch a certain point of the second input 122, and then move his or her finger along an area where the second input 122 is formed, in a counterclockwise direction (①) or clockwise direction (②). In this case, the second input 122 may sense a direction of rotation, a degree of rotation, a velocity of rotation, and so on.

Further, through the second input 122 formed as a touch panel, the user may select any of the first to fourth keys 122*a*-122*d* by touching a point corresponding to any of the first to fourth keys 122*a*-122*d*.

Meanwhile, when the second input 122 is formed as a touch panel, in order to distinguish a press input that selects any of the first to fourth keys 122*a*-122*d* from a rotation input, the processor 130 may make a determination based on whether or not a rotation manipulation is sensed from when a certain point on the second input 122 is touched to a preset time (e.g., 0.5 sec), such that the processor 130 may determine that a rotation input is received when sensing the rotation manipulation, and determine that a press input is received when not sensing the rotation manipulation.

Figure 5:
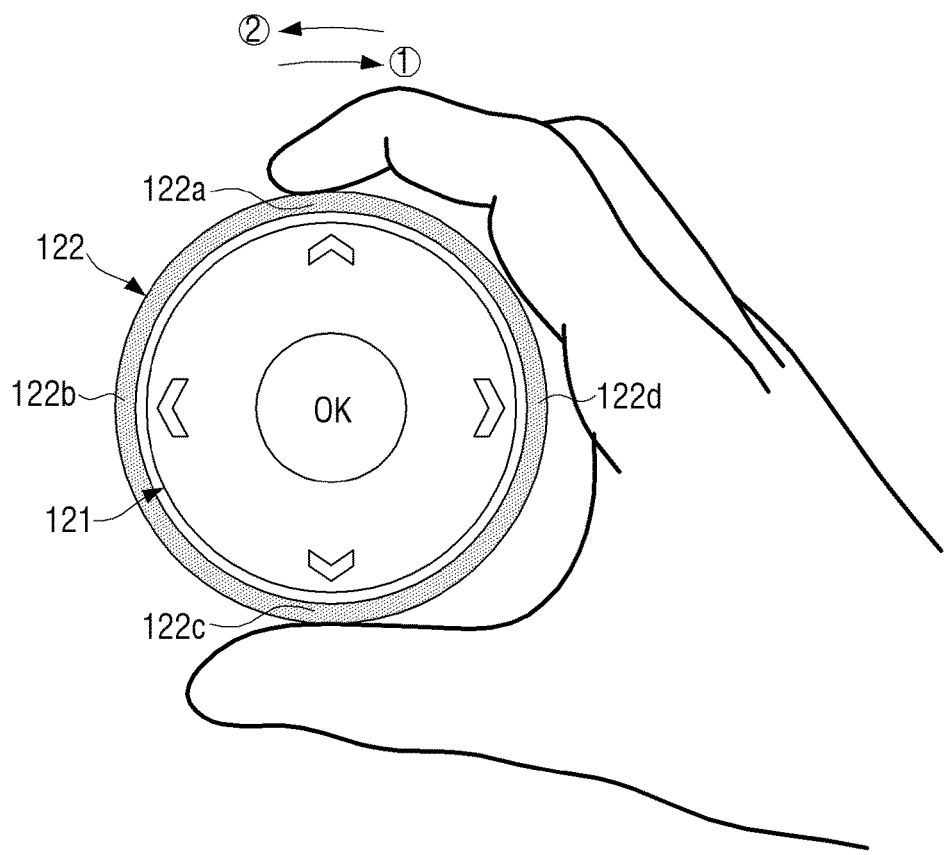

FIG. 5 illustrates the second input 122 formed as a rotatable member. For convenience of explanation, FIG. 5 illustrates only the first input 121 and the second input 122 of the remote control apparatus 100.

Referring to FIG. 5, the second input 122 is formed as a member with which a user can grab and rotate. Such rotatable member may be called a wheel, a bezel, or any other name.

Referring to FIG. 5, the user may grab the second input 122 and turn it in the clockwise direction (①), or in the counterclockwise direction (②). In this case, the second input 122 may sense a direction of rotation, a degree of rotation, a velocity of rotation, and so on.

Further, the second input 122 may be formed to be rotatable and to be pressed, in which case the user may select any of the first to fourth keys 122a-122d by pressing a location corresponding to any of the first to fourth keys 122a-122d.

According to another exemplary embodiment, the second input 122 may be formed as a touch panel and rotatable member. In this example, the user may select any of the first to fourth keys 122a-122d by touching a location corresponding to any of the first to fourth keys 122a-122d.

Meanwhile, the shape of the second input 122 is not limited to only the examples provided above. Accordingly, any form that can receive a rotation input may be applied. For example, the second input 122 may be configured as a jog shuttle, jog dial, and so on.

The processor 130 is configured to control the overall operation of the remote control apparatus 100.

Specifically, when the first direction key is selected from a plurality of direction keys of the first input 121, the processor 130 may control the communicator 110 to transmit a first control command to perform a function corresponding to the first direction and the first unit to the display apparatus 200. And when a key corresponding to the first direction key of the first input 121 is selected from a plurality of keys of the second input 122, the processor 130 may control the communicator 110 to transmit a second control command to perform a function corresponding to the first direction and the second unit greater than the first unit to the display apparatus 200.

The first direction key described above represents an arbitrary direction key among a plurality of direction keys of the first input 121, and therefore, not limited to any specific direction key. Accordingly, a "first direction key" herein without a reference numeral may refer to any direction key among a plurality of direction keys of the first input 121. That is, the first direction key does not necessarily refer to the first direction key 121a described with reference to FIG. 3. It may be any of the second to fourth direction keys 121b-121d.

Further, the "first key" as described above refers to a key of the second input 122 corresponding to the first direction key, in which the first key corresponds to the first direction key in view of position of arrangement and function. For example, in view of the position of arrangement, the first direction key may be the second direction key 121b in FIG. 3, in which case the first key may be the second key 122b at a corresponding location in FIG. 3.

Further, the "first unit" and the "second unit" described above represent different types of units according to a screen being displayed on the display apparatus 200. For example, when the display apparatus 200 is displaying a scrollable object, the first and second units may be the scroll distance units. In another example, when the display apparatus 200 is displaying an item list, the first unit may be an item unit and the second unit may be a page unit including a plurality of items. In yet another example, when the display apparatus 200 is playing content, the first unit may be a first time unit and the second unit may be a second time unit greater than the first time unit.

Hereinbelow, the first control command and the second control command described above will be described in more detail in association with the display operation at the display apparatus 200.

Figure 6A:
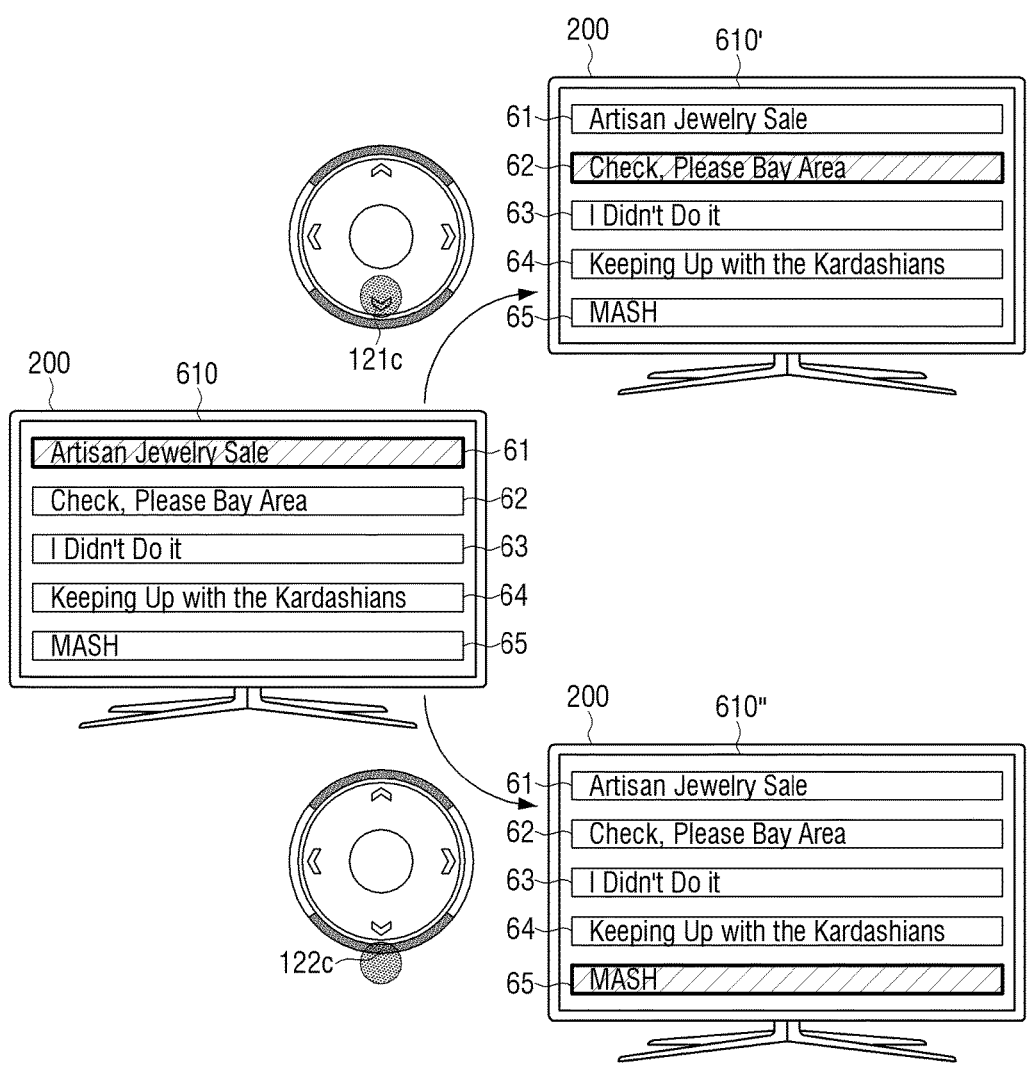
Figure 6B:
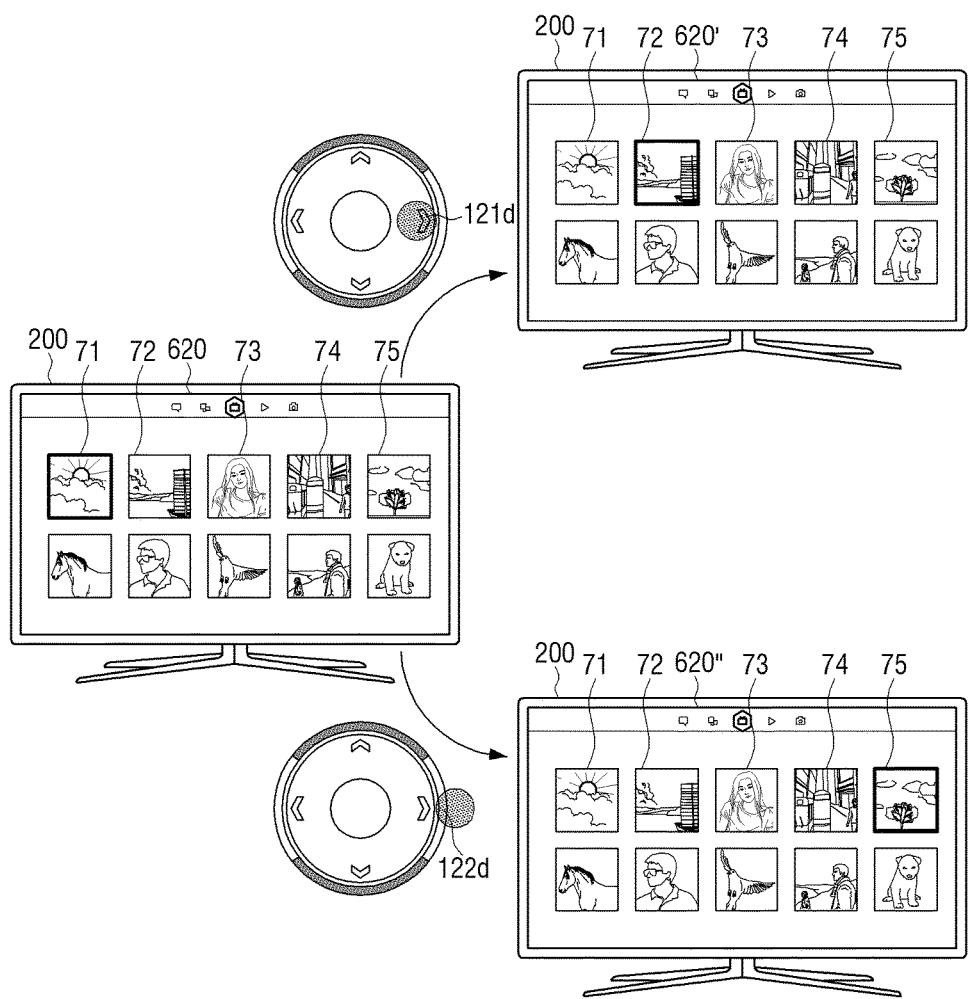

FIGS. 6A and 6B are views provided to explain display operation of a display apparatus 200 according to a control command transmitted from the remote control apparatus 100 according to various exemplary embodiments of the present disclosure.

Specifically, FIGS. 6A and 6B are provided to explain an example in which a control command is received from the remote control apparatus 100 while the display apparatus 200 is displaying an item list.

Referring to FIG. 6A, the display apparatus 200 may display an item list including a plurality of items.

The item list displayed on the display apparatus 200 enables search according to a control command received from the remote control apparatus 100. When searching the item list, it means that the user moves a cursor and so on to an item the user desires to select. Referring to FIG. 6A, a highlighting mark may be moved according to the item list search.

Specifically, FIG. 6A illustrates that the item list 610 of the display apparatus 200 displays a plurality of items 61-65, with a highlighting mark being present on the first item 61.

In this case, when a third direction key 121c of the first input 121 is selected at the remote control apparatus 100, the remote control apparatus 100 transmits to the display apparatus 200 a first control command to search the item list 610 based on item unit in a downward direction corresponding to the third direction key 121c.

In response to receiving the first control command, the display apparatus 200 searches the item list by item unit. As a result, the display apparatus 200 displays an item list 610' with the highlighting being present on the second item 62 that is immediately under the first item 61.

In another example, the item list 610 of the display apparatus 200 is displaying a plurality of items 61-65, and the highlighting mark is present on the first item. In this case, in response to selection of the third key 122c of the second input 122 corresponding to the third direction key 121c at the remote control apparatus 100, the remote control apparatus 100 transmits to the display apparatus 200 a second control command to search the item list 610 in page units in a downward direction.

The "page unit" as used herein represents a unit that includes a plurality of items. FIG. 6A illustrates that a page unit includes five items. Accordingly, in response to receiving the second control command, the display apparatus 200 searches the item list in page unit. As a result, the display apparatus 200 displays an item list 610" with the highlighting being present on the fifth item 65 that is the fifth item from the first item 61.

FIG. 6A exemplifies that the item list is searched in the downward direction only. However, the item list may be searched also in the upward direction.

Further, the item list may be searched in the leftward or rightward direction. This will be described below with reference to FIG. 6B.

Referring to FIG. 6B, the display apparatus 200 may display an item list including a plurality of items.

The item list displayed on the display apparatus 200 may be searched according to a control command received from the remote control apparatus 100. "Searching the item list" means that the cursor or the like is moved to an item the user desired to select. In the case of FIG. 6B, a thick border may be moved according to search of the item list.

Specifically, FIG. 6B illustrates that the item list 620 of the display apparatus 200 is displaying a plurality of items 71-75, with the thick border being shown on the first item 71.

In this case, in response to selection of the fourth direction key 121d of the first input 121 at the remote control apparatus 100, the remote control apparatus 100 transmits to the display apparatus 200 a first control command to search the item list 620 by the item unit in a right direction that corresponds to the fourth direction key 121d.

In response to receiving the first control command, the display apparatus 200 searches the item list by item unit. As a result, the display apparatus 200 displays an item list 620' having a thick border on the second item 72 to the right side of the first item 71.

In another example, while the item list 620 of the display apparatus 200 is displaying a plurality of items 71-75 and the thick border is indicated on the first item 71, in response to selection of the fourth key of the second input 122 corresponding to the fourth direction key 121d, the remote control apparatus 100 transmits to the display apparatus 200 a second control command to search the item list 620 by the page unit in the rightward direction.

The "page unit" as used herein represents a unit that includes a plurality of items. FIG. 6B illustrates that the page unit includes five items. Accordingly, in response to receiving the second control command, the display apparatus 200 searches the item list by the page unit. As a result, the display apparatus 200 displays an item list 620", with indicating a thick border on the fifth item 75 present in the rightmost side of the row of the first item 71 of the item list 620.

According to the exemplary embodiments described above, the user is able to search the item list in detail by manipulating the first input 121, and search the item list with increased speed by manipulating the second input 122. Above all, since the user can search a plurality of keys of the second input 122 at a location corresponding to the location at which a plurality of direction keys of the first input 122 are disposed, the user is able to know intuitively the functions of a plurality of keys of the second input 122 based on the functions of a plurality of direction keys. As a result, the user can search the item list with increased ease.

Figure 7A:
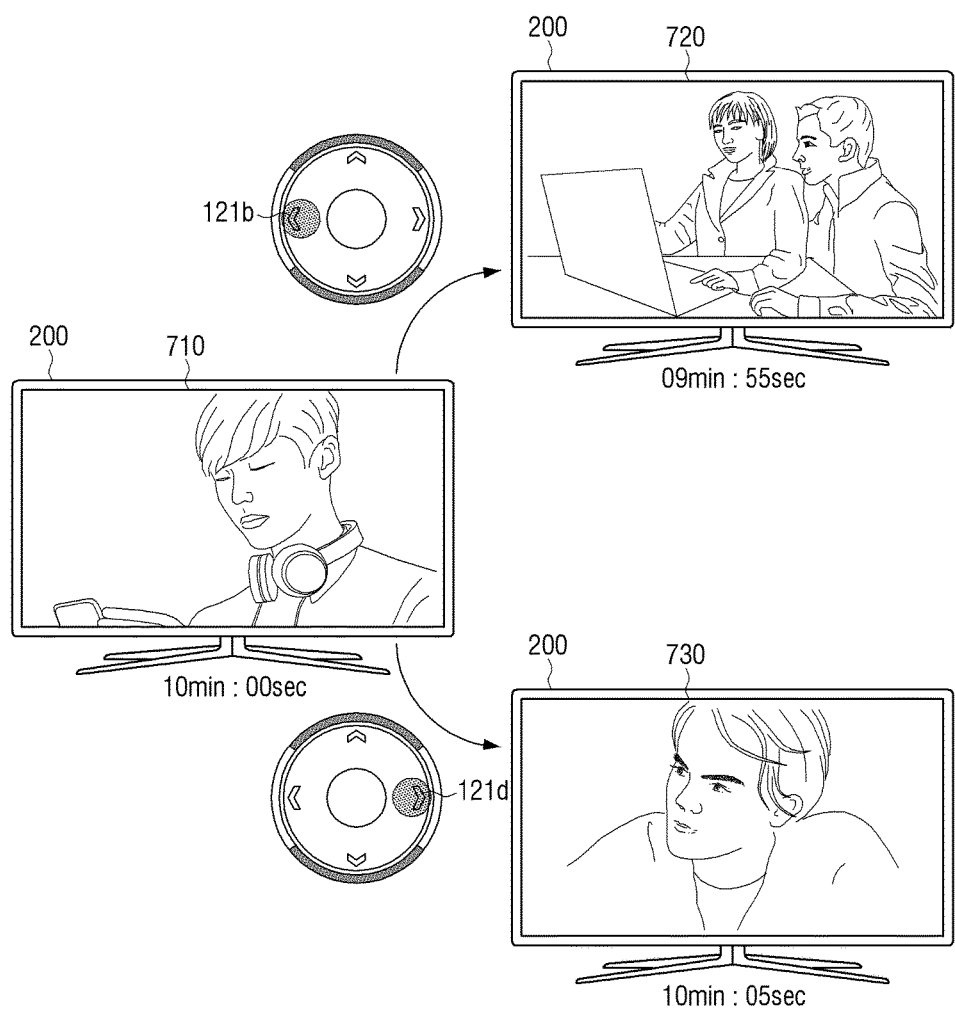
Figure 7B:
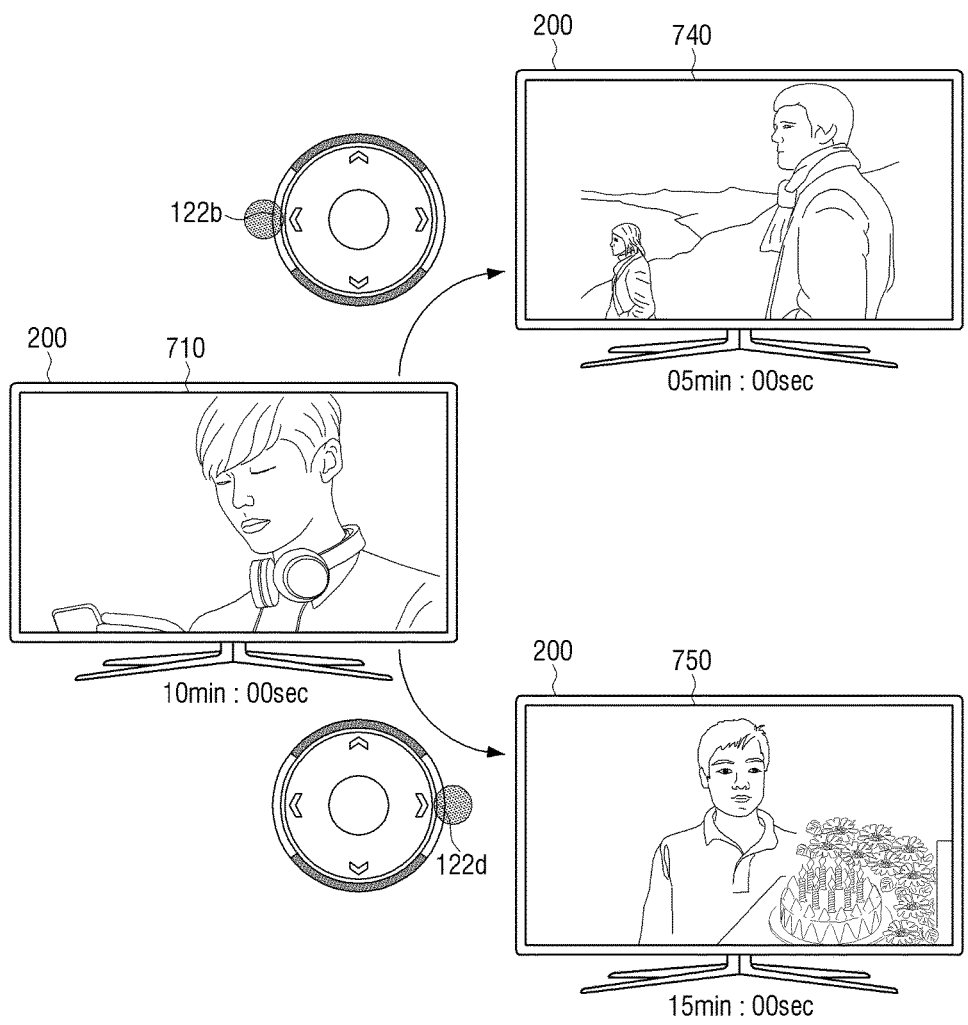

FIGS. 7A and 7B are views provided to explain a display operation of the display apparatus 200 according to the control command transmitted from the remote control apparatus 100 according to yet another exemplary embodiments of the present disclosure.

Specifically, FIGS. 7A and 7B are provided to explain an example in which a control command is received from the remote control apparatus 100 while content is being displayed on the display apparatus 200.

Referring to FIG. 7A, the display apparatus 200 may display the currently-played content.

The content played on the display apparatus 200 may be skipped according to a control command to skip that is received from the remote control apparatus 100. "Skipping the content" means that the time of playing the content is moved from the current play time by a predetermined time forward or a predetermined time backward. The example of FIG. 7A may skip the content by 5 seconds.

Specifically, referring to FIG. 7A, while a screen 710 is being displayed on the display apparatus 200, with the time of plying the content of 10 min:00 sec, in response to selection of the second direction key 121b of the first input 121 at the remote control apparatus 100, the remote control apparatus 100 transmits to the display apparatus 200 a first control command to skip the content by a first time unit, i.e., by 5 seconds, in the play direction corresponding to the second direction key 121b.

In response to receiving the first control command, the display apparatus 200 skips forward the content by the first time unit (i.e., 5 sec). As a result, the display apparatus 200 displays a screen 720 at 09 min:55 sec that is 5 seconds before the played screen of 10 min:00 sec.

In contrast, while the screen 710 with content play time of 10 min:00 sec is being displayed on the display apparatus 200, in response to selection of the fourth direction key 121d of the first input 121 at the remote control apparatus 100, the remote control apparatus 100 transmits to the display apparatus 200 the first control command to skip the content by the first time unit, i.e., by 5 seconds, in the play direction corresponding to the fourth direction key 121d.

In response to receiving the first control command, the display apparatus 200 skips backward the content by the first time unit, i.e., by 5 seconds. As a result, the display apparatus 200 displays a screen 730 at 10 min:05 sec that is 5 seconds after the played screen of 10 min:00 sec.

The exemplary embodiment above describes an example in which the content is skipped by the first time unit according to a manipulation on the first input, while the exemplary embodiment below describes an example in which the content is skipped by the second time unit that is greater than the first time unit, according to the manipulation on the second input.

Referring to FIG. 7B, the display apparatus 200 may display the currently-played content.

The content being played on the display apparatus 200 may be skipped according to a control command to skip that is received from the remote control apparatus 100. "Skipping the content" means that the time of playing the content is moved from the current play time by a predetermined time forward or by a predetermined time backward. The example of FIG. 7B may skip the content by 5-minute unit that is greater than the time unit of FIG. 7A (i.e., 5 sec).

Specifically, referring to FIG. 7B, while the screen 710 of content play time of 10 min:00 sec is being displayed on the display apparatus 200, in response to selection of the second key 122b corresponding to the second direction key 121b that was selected as shown in FIG. 7A, the remote control apparatus 100 transmits to the display apparatus 200 a second control command to skip the content by the second time unit that is greater than the first time unit, i.e., by 5 minutes, in the play direction corresponding to the second direction key 121b.

In response to receiving such second control command, the display apparatus 200 skips the content forward by the second time unit, i.e., by 5-minute unit. As a result, the display apparatus 200 displays a screen 740 of 05 min:00 sec that is 5 minutes before the played screen of 10 min:00 sec.

In contrast, while the screen 710 of content play time of 10 min:00 sec is being displayed on the display apparatus 200, in response to selection of the fourth key 122d corresponding to the fourth direction key 121d that was selected as shown in FIG. 7A, the remote control apparatus 100 transmits to the display apparatus 200 a second control command to skip the content by the second time unit that is greater than the first time unit, i.e., by 5 minutes, in the play direction corresponding to the fourth direction key 121d.

In response to receiving such second control command, the display apparatus 200 skips the content backward by the second time unit, i.e., by 5-minute unit. As a result, the display apparatus 200 displays a screen 740 of 15 min:00 sec that is 5 minutes after the played screen of 10 min:00 sec.

According to the exemplary embodiments described above, the user is able to skip the time of playing the currently-played content in more detail by manipulating the first input 121, and skip the time of playing the currently-played content with increased speed by manipulating the second input 122. Above all, the user is able to know intuitively the functions of a plurality of keys of the second input 122 based on the functions of a plurality of direction keys, because the user can find a plurality of keys of the second input 122 at a location corresponding to the location at which a plurality of direction keys are disposed. Accordingly, the user is able to skip the time of playing the content with increased ease.

Figure 8A:
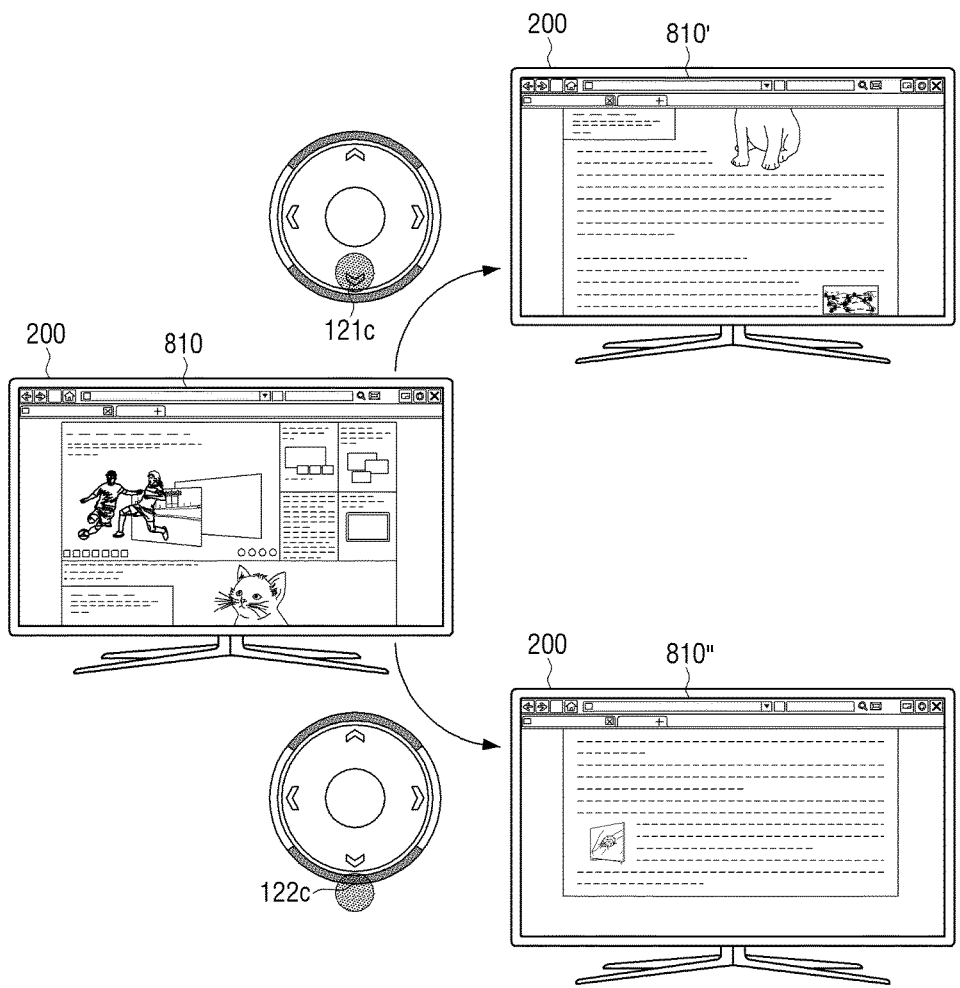
Figure 8B:
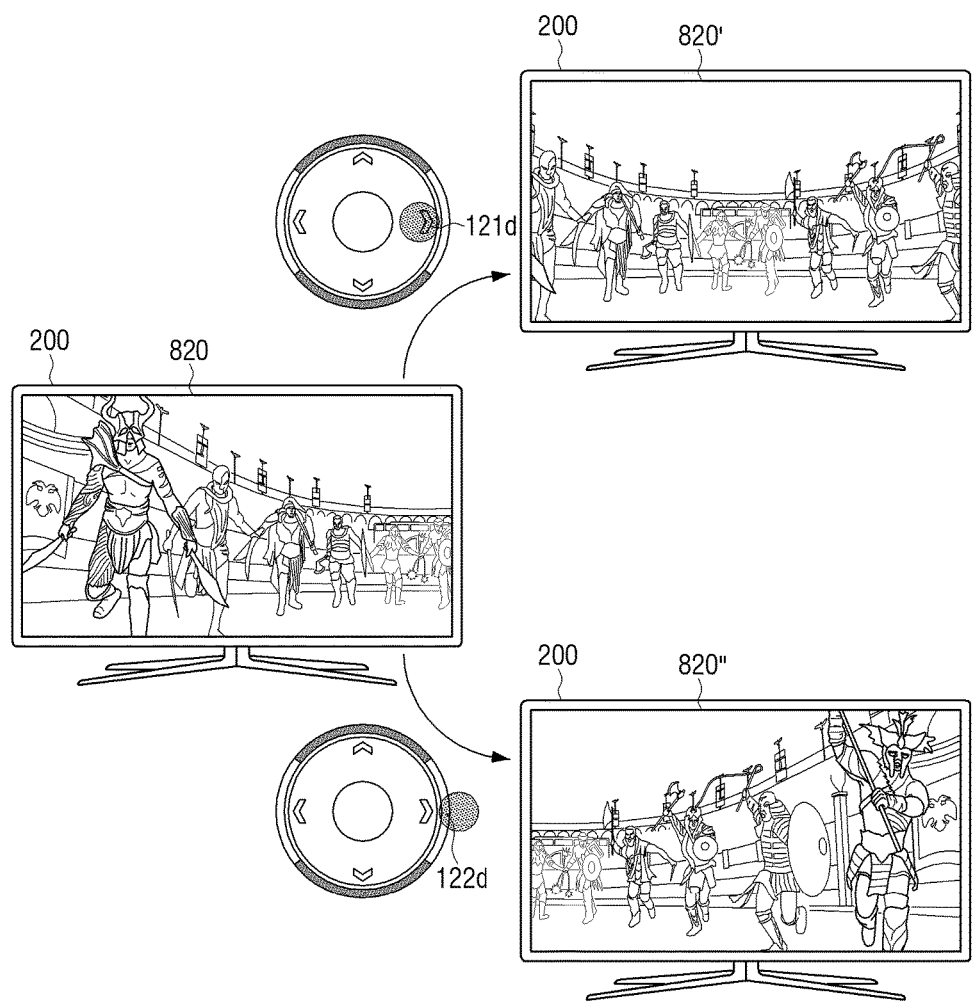

FIGS. 8A and 8B are views provided to explain a display operation of the display apparatus 200 according to transmission of a control command from the remote control apparatus 100, according to yet another exemplary embodiment of the present disclosure.

Specifically, FIGS. 8A and 8B are provided to explain an example in which a control command is received from the remote control apparatus 100 while a scrollable object is being displayed on the display apparatus 200.

Referring to FIG. 8A, the display apparatus 200 is able to display a scrollable object and scroll the object according to a control command to scroll that is received from the remote control apparatus 100. "Scrolling an object" means that, while only a portion of an object is being displayed due to a limited screen size of the display apparatus 200, the scrolling causes the object that was outside the screen into view, while causing the previously-displayed object to disappear out of the screen.

Specifically, referring to FIG. 8A, while a scrollable object 810 is being displayed on the display apparatus 200, in response to selection of the third direction key 121c of the first input 121, the remote control apparatus 100 transmits to the display apparatus 200 the first control command to scroll the object by the first length unit, in a downward direction corresponding to the third direction key 121c.

In response to receiving such first control command, the display apparatus 200 scrolls the object downward, by the first length unit. As a result, the display apparatus 200 displays the object 810' that is scrolled by the first length unit, e.g., by 10-pixel unit.

In contrast, while the scrollable object 810 is being displayed on the display apparatus 200, in response to selection of the third key 122c corresponding to the third direction key 121c at the remote control apparatus 100, the remote control apparatus 100 transmits to the display apparatus 200 the second control command to scroll the object in a downward direction corresponding to the third direction key 121c, by a second length unit that is greater than the first length unit.

In response to receiving such second control command, the display apparatus 200 scrolls the object downward, by the second length unit. As a result, the display apparatus 200 displays the object 810" scrolled by the second length unit, e.g., by 30-pixel unit.

Although FIG. 8A exemplifies that the scrollable object is an internet web browser, it will be assumed below that the scrollable object is an image.

Referring to FIG. 8B, while a scrollable image 820 is being displayed on the display apparatus 200, in response to selection of the fourth direction key 121d of the first input 121 at the remote control apparatus 100, the remote control apparatus 100 transmits to the display apparatus 200 the first control command to scroll the image by a first length unit, in a rightward direction corresponding to the fourth direction key 121d.

In response to receiving such first control command, the display apparatus 200 scrolls the image 820 in the rightward direction by the first length unit. As a result, the display apparatus 200 displays an image 820' that is scrolled in the rightward direction by the first length unit, e.g., by 10-pixel unit.

In contrast, while a scrollable image 820 is being displayed on the display apparatus 200, in response to selection of the fourth key 122d of the second input corresponding to the fourth direction key 121d at the remote control apparatus 100, the remote control apparatus 100 transmits to the display apparatus 200 the second control command to scroll the image by a second length unit, in a rightward direction corresponding to the fourth direction key 121d.

In response to receiving such second control command, the display apparatus 200 scrolls the image 820 in the rightward direction by the second length unit. As a result, the display apparatus 200 displays an image 820" that is scrolled in the rightward direction by the second length unit, e.g., by 30-pixel unit.

According to the exemplary embodiments described above, the user is able to scroll the scrollable object in more detail by manipulating the first input 121, and also scroll the scrollable object with increased speed by manipulating the second input 122. Above all, because the user is able to find a plurality of keys of the second input 122 at a location corresponding to the location at which a plurality of direction keys are displayed, the user is able to know intuitively the functions of a plurality of keys of the second input 122 based on the functions of a plurality of direction keys of the first input 121. Accordingly, the user is able to scroll the object with increased ease.

Meanwhile, according to yet another exemplary embodiment, the second input 122 is able to receive a press input corresponding to a plurality of keys as described above, and also is able to receive a rotation input. Specifically, the second input 122 may be formed as a touch panel to receive a rotation input, and as described with reference to FIG. 5, the second input 122 may be formed as a rotatable member to receive a rotation input.

The processor 130 may control the communicator 110 to transmit to the display apparatus 200 a third control command to perform a function corresponding to a rotation input received through the second input 122. Hereinbelow, controlling of the display apparatus 200 according to a rotation input will be described.

FIG. 9 is a view provided to explain a display operation of the display apparatus 200 according to transmission of a control command of the remote control apparatus 100, according to yet another exemplary embodiment of the present disclosure.

Referring to FIG. 9, the display apparatus 200 may display currently-played content.

The display apparatus 200 may move the time of playing the content forward or backward according to a control command corresponding to the rotation input received from the remote control apparatus 100. "Moving the time of playing content" means moving the time of playing content from the current time of playing by a predetermined forward or by a predetermined time backward.

Specifically, referring to FIG. 9, while a screen 910, in which the content is played normally, is being displayed on the display apparatus 200, in response to receiving a rotation input from the second input 122 of the remote control apparatus 100, the remote control apparatus 100 transmits to the display apparatus 200 a third control command to move the time of playing content backward or forward in accordance with the direction of rotation of the received rotation input.

In response to receiving such third control command, the display apparatus 200 moves the time of playing content forward or backward. For example, in the example of FIG. 9, the time of playing content is moved forward when the direction of rotation of the rotation input is clockwise. In this example, the velocity of moving the time of playing content is determined according to the velocity of rotation of the rotation input.

For example, when the direction of rotation of the rotation input is clockwise and the velocity of rotation is less than a preset degree (①), the time of playing the content is moved backward by a first speed (920). When the direction of rotation of the rotation input is clockwise and the velocity of rotation is equal to or greater than the preset velocity (②), the time of playing content is moved backward by a second speed that is faster than the first speed (930).

In the above example, the display apparatus 200 may receive in real-time the information on the velocity of rotation of the rotation input from the remote control apparatus 100 and adjust in real-time the speed of moving the time of playing. Accordingly, as illustrated in FIG. 9, while the time of playing content is being moved by the first speed (920), in response to receiving a rotation input with a velocity of rotation equal to or greater than a preset degree from the second input 122 of the remote control apparatus 100 (③), the display apparatus 200 accordingly moves the time of playing content backward by the second speed in consideration of the above (930).

Meanwhile, while the time of playing content on the display apparatus 200 is being moved (930), when a reception of the rotation input from the second input 122 is stopped (④), the processor 130 may control the communicator 110 to transmit a control command to temporarily pause playing the content. As a result, the display apparatus 200 may temporarily pause playing the content (940).

Meanwhile, when the second input 122 is implemented as a touchscreen, although the reception of the rotation input is stopped, the display apparatus 200 may temporarily pause playing the content as long as a user touch is sensed at the second input 122 (940). After that, when a user touch is not sensed at the second input 122, the display apparatus 200 plays the content with normal play speed.

Further, while the content is temporarily paused from being played (940), in response to receiving a rotation input with a velocity of rotation equal to or greater than a preset degree from the second input 122 of the remote control apparatus 100 (⑤), the display apparatus 200 moves the time of playing content backward by the second speed (930).

Meanwhile, although moving the time of playing content according to the exemplary embodiment is described above based on an example in which the direction of rotation of the rotation input is clockwise, the operation is the same even when the direction is counterclockwise.

Specifically, referring to FIG. 9, while a screen 910, in which the content is played normally, is being displayed on the display apparatus 200, in response to receiving a rotation input in which the direction of rotation of the rotation input is counterclockwise, the time of playing content is moved backward. In this example, the speed of moving the time of playing content is determined according to the velocity of rotation input.

For example, when the direction of rotation of the rotation input is counterclockwise and when the velocity of rotation is less than a preset degree (⑥), the time of playing content is moved by the first speed (950). When the direction of rotation of the rotation input is counterclockwise and when the velocity of rotation is equal to or greater than a preset degree (⑦), the time of playing content is moved forward by the second speed that is faster than the first speed (960).

In the above example, the display apparatus 200 may receive in real-time the information on the velocity of rotation of the rotation input from the remote control apparatus 100 and adjust in real-time the speed of moving the time of playing. Accordingly, as illustrated in FIG. 9, while the time of playing content is being moved by the first speed (950), in response to receiving a rotation input with a velocity of rotation equal to or greater than a preset degree from the second input 122 of the remote control apparatus 100 (⑧), the display apparatus 200 accordingly moves the time of playing content forward by the second speed in consideration of the above (960).

According to the exemplary embodiments described above, the user is able to move the time of playing content more conveniently, with the second input 121 that can receive a rotation input.

According to yet another exemplary embodiment, while an item list is being displayed on the display apparatus 200, in response to receiving a control command corresponding to the rotation input from the remote control apparatus 100, the display apparatus 200 may search the item list in a direction corresponding to the rotation direction of the rotation input.

According to yet another exemplary embodiment, while a scrollable object is being displayed on the display apparatus 200, in response to receiving a control command corresponding to the rotation input from the remote control apparatus 100, the display apparatus 200 may scroll the object in a direction corresponding to the direction of rotation of the rotation input.

Figure 10:
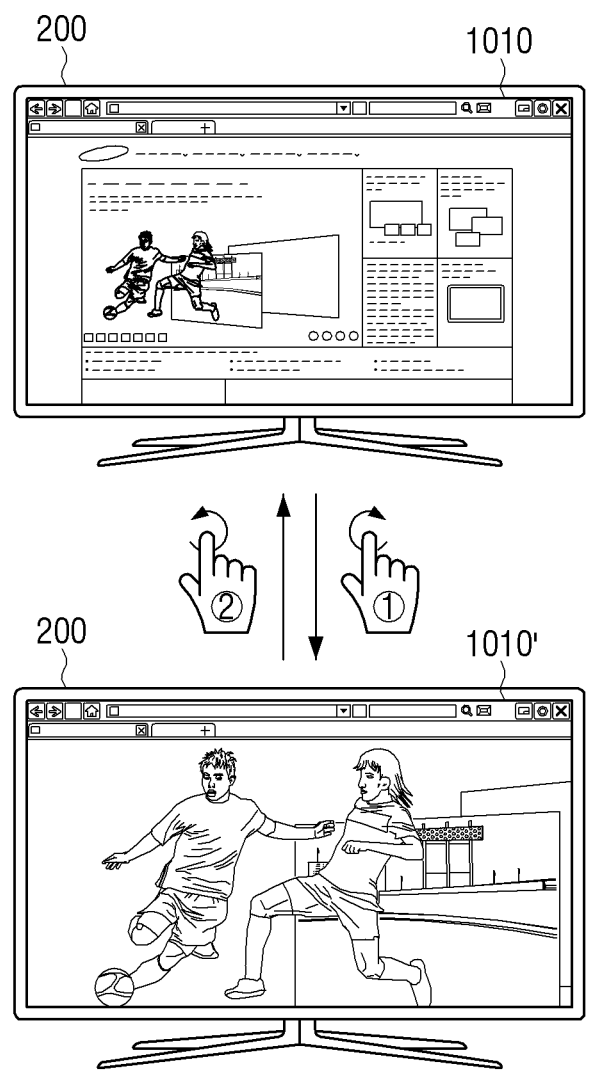

According to yet another exemplary embodiment, while a web browser is being displayed on the display apparatus 200 as illustrated in FIG. 10, in response to receiving a control command corresponding to the rotation input from the remote control apparatus 100, the display apparatus 200 may zoom in or zoom out the web browser according to the direction of rotation of the rotation input. For example, as illustrated in FIG. 10, while 100% size web browser 1010 is being displayed on the display apparatus 200, in response to receiving a rotation input in a clockwise direction (①), the web browser 1010 may be zoomed in such that a 150% size web browser 1010' may be displayed. In contrast, in response to receiving a rotation input in a counterclockwise direction (②), the web browser size is zoomed out from the display state of 150% size web browser such that 100% size web browser 1010 may be displayed.

As described above, the rotation input received at the second input 122 may bring in a variety of effects according to the types of content displayed on the display apparatus.

Figure 11:
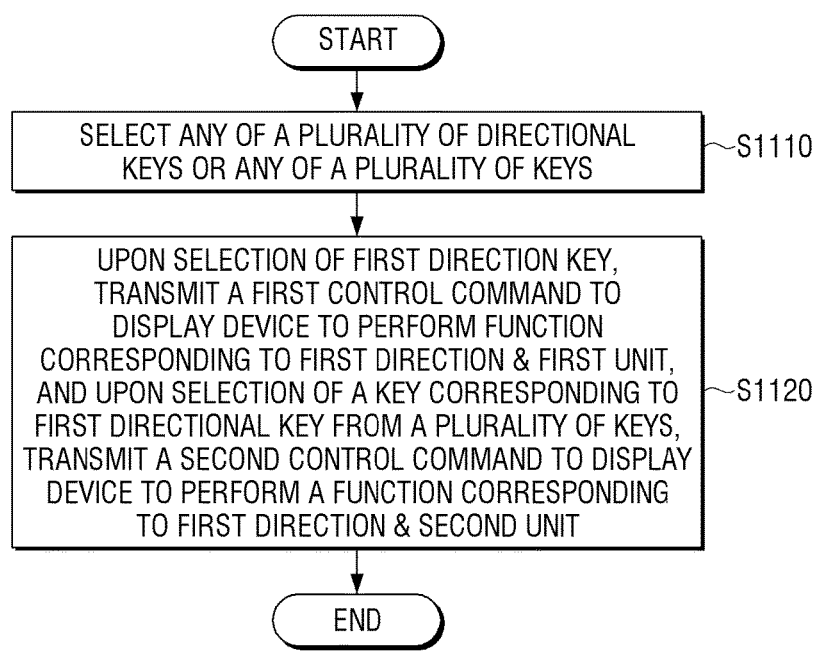
FIG. 11 is a flowchart provided to explain a controlling method of a remote control apparatus according to an exemplary embodiment.

FIG. 11 is a flowchart of a method for controlling by a remote control apparatus that includes a plurality of direction keys and a plurality of keys corresponding to a plurality of direction keys, and that is capable of communicating with the display apparatus, according to an exemplary embodiment of the present disclosure.

Referring to FIG. 11, at S1110, any of a plurality of direction keys or any of a plurality of keys is selected.

At S1120, when the first direction key is selected from a plurality of direction keys, the first control command is transmitted to the display apparatus to perform a function corresponding to the first direction and the first unit, and when the key corresponding to the first direction key is selected from a plurality of keys, a second control command is transmitted to the display apparatus to perform the function corresponding to the first direction and the second unit that is greater than the first unit.

While an item list is being displayed on the display apparatus, in response to selection of the first direction key among a plurality of direction keys of the remote control apparatus, the remote control apparatus may transmit to the display apparatus the first control command to search the item list by an item unit. Further, when the item list is being displayed on the display apparatus, in response to selection of a key corresponding to the first direction key from among a plurality of keys of the remote control apparatus, the remote control apparatus may transmit to the display apparatus the second control command to search the item list by a unit of page that includes a plurality of items.

Meanwhile, while the content is being played on the display apparatus, in response to selection of the first direction key among a plurality of direction keys of the remote control apparatus, the remote control apparatus may transmit to the display apparatus the first control command to skip the content by the first time unit, in a play direction corresponding to the first direction. Further, while the content is being played on the display apparatus, in response to selection of a key corresponding to the first direction key from among a plurality of keys of the remote control apparatus, the remote control apparatus may transmit to the display apparatus the second control command to skip the content in the play direction corresponding to the first direction, by the second time unit that is greater than the first time unit.

Meanwhile, while a scrollable object is being displayed on the display apparatus, in response to selection of the first direction key among a plurality of direction keys of the remote control apparatus, the remote control apparatus may transmit to the display apparatus the first control command to scroll the object in the first direction and by the first length unit. Further, while the scrollable object is being displayed on the display apparatus, in response to selection of a key corresponding to the first direction key from among a plurality of keys, the remote control apparatus may transmit to the display apparatus the second control command to scroll the object in the first direction and by the second length unit that is greater than the first length unit.

Meanwhile, in the remote control apparatus, a group of a plurality of direction keys may be disposed inside an area where a group of a plurality of keys is disposed, in which a plurality of direction keys may be disposed at locations corresponding to the locations of a plurality of keys.

Meanwhile, the remote control apparatus may receive a rotation input and transmit to the display apparatus the third control command to perform a function corresponding to the received rotation input. In this case, the remote control apparatus may include a touchpad or a rotatable member and receive the rotation input therethrough.

Specifically, while the content is being played on the display apparatus, the third control command may be a control command to move forward or backward the time of playing content according to the direction of rotation of the rotation input. Further, while the time of playing content is being moved forward or backward in the display apparatus, when the reception of the rotation input is stopped, the remote control apparatus may transmit to the display apparatus a control command to temporarily pause playing the content.

Meanwhile, while an item list is being displayed on the display apparatus, the third control command may be a control command to search the item list in a direction corresponding to the direction of rotation of the rotation input.

Meanwhile, while a scrollable object is being displayed on the display apparatus, the third control command may be a control command to scroll the object in a direction corresponding to the rotation of rotation of the rotation input.

Meanwhile, while a reducible or expandable object is being displayed on the display apparatus, the third control command may be a control command to expand or reduce the object according to the direction of rotation of the rotation input.

Meanwhile, methods according to the various exemplary embodiments described above may be created as software and loaded on electronic apparatuses.

For example, a recording medium for performing a method for controlling of a remote control apparatus including a plurality of direction keys and a plurality of keys corresponding to a plurality of direction keys may be provided. Specifically, a non-transitory computer readable medium may be provided, storing therein a program to perform operations of, in response to selection of a first direction key among a plurality of direction keys, transmitting to the display apparatus a first control command to perform a function corresponding to the first direction and a first unit; and in response to selection of a key corresponding to the first direction key from among a plurality of keys, transmitting to the display apparatus a second control command to perform a function corresponding to the first direction and a second unit greater than the first unit.

The non-transitory computer readable medium refers to a medium that is capable of storing data semi-permanently rather than a medium that stores data for brief time, such as register, cache, memory, and so on, and that is readable by machines. Specifically, the various applications or programs described above may be stored on a non-transitory computer readable medium such as CD, DVD, hard disk, bluray disk, USB, memory card, ROM, and so on and provided.

Meanwhile, the various exemplary embodiments described above may be implemented on a recording medium that can be read by a computer or a similar device, using software, hardware, or a combination thereof. The hardware level implementation of the exemplary embodiments described herein may include use of at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for preforming functions. In some implementations, the exemplary embodiments described herein may be the processor 130 itself. According to the software level implementation, the exemplary embodiments regarding the procedures, functions, and so on described herein may be implemented as separate software modules. Each of the software modules may perform one or more functions and operations that are described herein.

As described above, the user convenience in manipulating the remote control apparatus can be enhanced, since the user is able to find the keys with high relevance with the direction keys immediately beside the direction keys.

Figure 12:
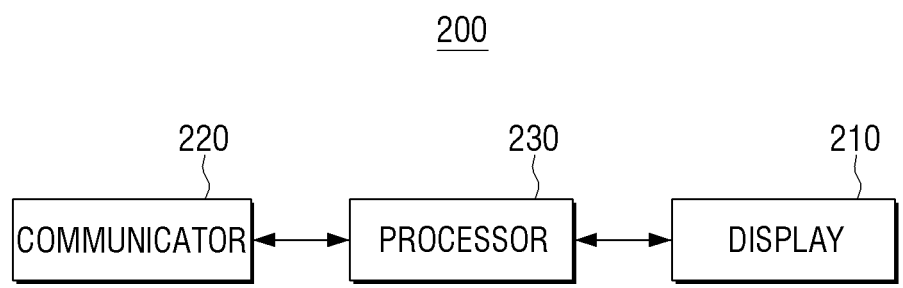
FIG. 12 is a block diagram provided to explain a configuration of a display apparatus according to an exemplary embodiment of the present disclosure.

FIG. 12 is a block diagram provided to explain a configuration of the display apparatus 200 according to an exemplary embodiment of the present disclosure.

Referring to FIG. 12, the display apparatus 200 includes a display 210, a communicator 220, and a processor 230. The display apparatus 200 may be a smart TV, but not limited thereto. Accordingly, the display apparatus 200 may be implemented as a projection TV, a monitor, a laptop PC, a tablet, or a variety of other display apparatuses.

The display 210 is configured to display a variety of screens according to controlling of the processor 230.

For example, the display 210 may be implemented as a liquid crystal display (LCD), and in some embodiments, may also be implemented as a cathode-ray tube (CRT), plasma display panel (PDP), organic light emitting diodes (OLED), transparent OLED (TOED), and so on. Further, the display 210 may be implemented in a form of a touchscreen that can sense a user's touch manipulation.

The communicator 220 is configured to perform communication with an external device by various types of communication techniques. Specifically, the communicator 220 my receive a control command transmitted from the remote control apparatus 100. In this example, the control command may be received in a form of IR signal, Bluetooth signal, or a variety of other forms.

Further, the communicator 220 may include a variety of communication chips that support wired/wireless communication. For example, the communicator 220 may include WiFi chip, Bluetooth chip, wireless communication chip, or a variety of other communication chips. The WiFi chip and the Bluetooth chip each perform communications in WiFi and Bluetooth manners. The wireless communication chip represents a chip that performs communication according to various communication standards including IEEE, Zigbee, 3rd Generation (3G), 3rd Generation Partnership Project (3GPP), Long Term Evolution (LTE), and so on. In addition, the communicator 220 may include NFC chip that operates in the near field communication (NFC) manner.

The processor 230 is configured to control the overall operation of the display apparatus 200. Specifically, the processor 230 controls the overall operations of the display apparatus 200, using respective programs stored at a storage (not illustrated) of the display apparatus 200. For example, the processor 230 may include CPU, RAM, ROM, or system bus. The ROM herein represents a configuration that stores a set of instructions for system booting. The CPU copies the operating system (O/S) stored at the storage of the display apparatus 200 onto RAM according to the instructions stored at ROM, and boots up the system by running O/S. When booting is completed, the CPU may copy respective applications stored at the storage onto RAM, and perform various operations by running them. Although the processor 230 is exemplified above as including only one CPU, in actual implementation, this may be implemented as a plurality of CPUs (or DSPs, SoCs, and so on).

Specifically, in response to receiving the first control command corresponding to the first direction key among a plurality of direction keys of the remote control apparatus 100, the processor 230 controls the display 210 to perform a display operation corresponding to the first direction and the first unit. Further, in response to receiving the second control command corresponding to the first key corresponding to the first direction key from among a plurality of keys of the remote control apparatus 100, the processor 230 may control the display 210 to perform a display operation corresponding to the first direction and the second unit that is greater than the first unit.

According to an exemplary embodiment, while an item list is being displayed on the display 210 as illustrated in FIGS. 6A and 6B, the processor 230 may search the item list in response to a control command received from the remote control apparatus 100.

Specifically, in response to receiving the first control command corresponding to the first direction key from the remote control apparatus 100, the processor 230 may search the item list in the first direction and by the item unit. That is, as illustrated in FIG. 6A, the processor 230 may control the display 210 to move highlighting by the item unit and display the same. Meanwhile, in response to receiving the second control command corresponding to the key corresponding to the first direction key from among a plurality of keys from the remote control apparatus 100, the processor 230 may search the item list in the first direction and by a page unit.

According to yet another exemplary embodiment, while the content play screen is being displayed on the display 210, as illustrated in FIGS. 7A and 7B, the processor 230 may skip the content by a specific time unit according to the control command received from the remote control apparatus 100.

Specifically, in response to receiving the first control command corresponding to the first direction key from the remote control apparatus 100, the processor 230 may skip the content in the play direction corresponding to the first direction and by a first time unit. That is, as illustrated in FIG. 7A, the processor 230 may control the display 210 to display a play screen that is 5 sec after or 5 sec before the currently-played screen. Meanwhile, in response to receiving a second control command corresponding to the key corresponding to the first direction key from among a plurality of keys from the remote control apparatus 100, the processor 230 may skip the content in the play direction corresponding to the first direction and by the second time unit that is greater than the first time unit. That is, as illustrated in FIG. 7B, the processor 230 may control the display 110 to display a play screen that is 5 min before or 5 min after the currently-played screen.

According to yet another exemplary embodiment, while a scrollable object is being displayed on the display 210 as illustrated in FIGS. 8A and 8B, the processor 230 may scroll the object according to a control command received from the remote control apparatus 100.

Specifically, in response to receiving the first control command corresponding to the first direction key from the remote control apparatus 100, the processor 230 may scroll the object in the first direction and by the first length unit. That is, as illustrated in FIG. 8A, the processor 230 may control the display 210 to display a downwardly-scrolled screen. Meanwhile, in response to receiving the second control command corresponding to a key corresponding to the first direction key from among a plurality of keys from the remote control apparatus 100, the processor 230 may scroll the object in the first direction and by the second length unit that is greater than the first length unit.

Meanwhile, in response to receiving a control command corresponding to a rotational input from the remote control apparatus 100, the processor 230 may perform a display operation based on the content currently displayed on the display 210, direction of rotation of the rotation input, and velocity of rotation.

Specifically, while the content play screen is being displayed on the display 210 as illustrated in FIG. 9, the processor 130 may move the time of playing content forward or backward according to the control command corresponding to the received rotation input. That is, as illustrated in FIG. 9, the processor 230 may control the display 210 to display a screen with the time of playing moved forward or moved backward.

Meanwhile, while the time of playing content is being moved on the display apparatus 200, when the reception of the rotation input from the remote control apparatus 100 is stopped, the processor 230 may temporarily pause playing the content. That is, the processor 230 may control the display 210 to display the play screen that has been displayed at the time the reception of the rotation input was stopped, in the temporarily paused form.

According to yet another exemplary embodiment, while an expandable or reducible object is being displayed on the display 210 as illustrated in FIG. 10, in response to input of a control command corresponding to the rotation input from the remote control apparatus 100, the processor 230 may control the display 210 to expand or reduce the object according to the direction of rotation of the rotation input and display the same.

As described above, the display apparatus 200 can control the display operation by the first unit, and the second unit greater than the first unit, according to controlling by the remote control apparatus 100.

Meanwhile, according to an exemplary embodiment of the present disclosure, the first unit and the second unit described above may be set by a user. Specifically, the processor 230 may display a user interface (UI) screen to set a value corresponding to the first unit, and/or a value corresponding to the second unit, and control the display 210 to perform a display operation based on the value set through the UI screen. This will be described in more detail below with reference to FIGS. 13 to 16.

FIGS. 13 to 16 are views provided to explain UI screens displayed on the display apparatus 200 according to a variety of embodiments of the present disclosure. FIGS. 13 to 16 illustrate the setting UI screens that can be displayed on the display 210 when the second input 122 described above is named 'Edge scroll key'.

Figure 13:
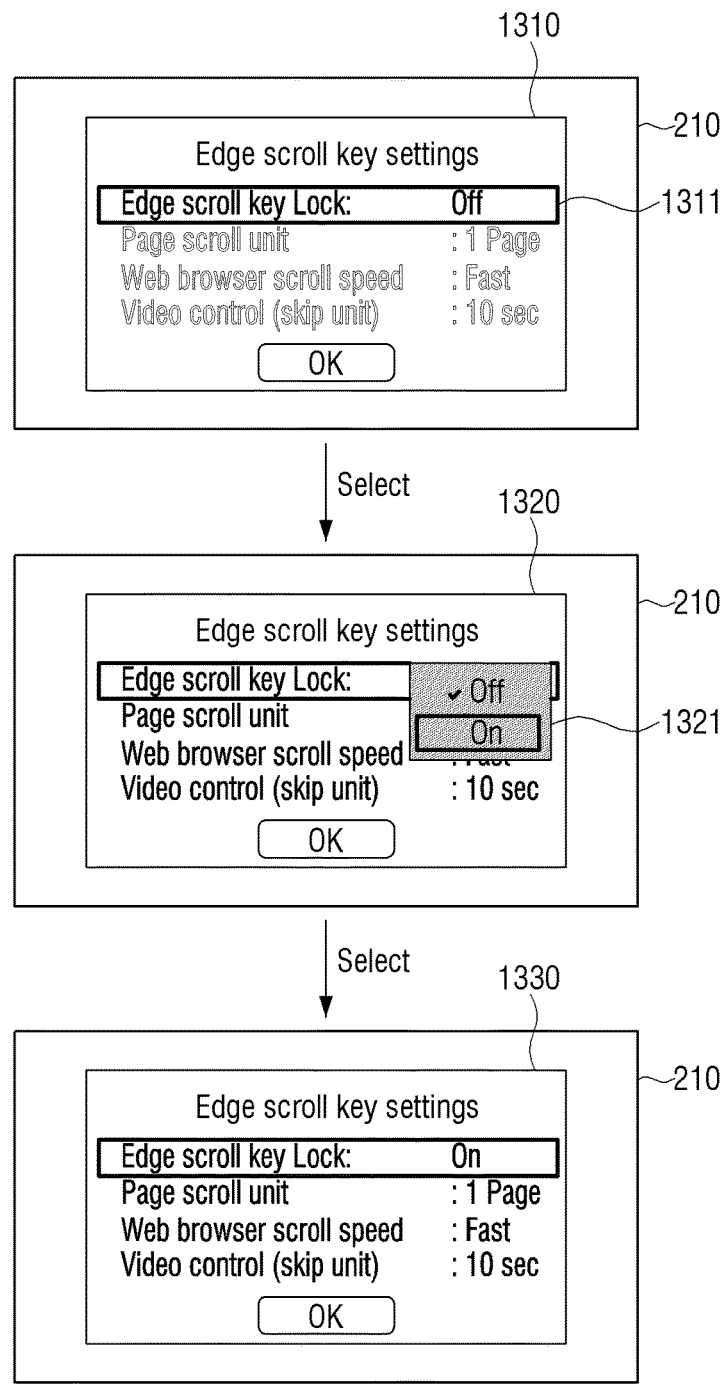
FIGS. 13 to 16 illustrate setting UIs displayed on a display apparatus according to a variety of exemplary embodiments.

Referring to FIG. 13, the user may set whether or not to activate the second input 122 of the remote control apparatus 100.

Specifically, as illustrated in FIG. 13, while a setting UI screen 1310 indicating the second input 122 in an inactivated state is being displayed on the display 210, when the user selects activation/inactivation, i.e., On/Off item 1311 of the second input 122 through the first input 121 of the remote control apparatus 100, the set UI screen 1320, including a popup window 1321 to allow selection as to activation or inactivation, is displayed. Then when the user selects 'On', the set UI screen 1330 indicating the second input 122 in the active state is displayed on the display 210.

When the second input 122 is set to inactivated state, the processor 230 may ignore the control command corresponding to manipulation of the second input 122 that is received from the remote control apparatus 100.

Figure 14:
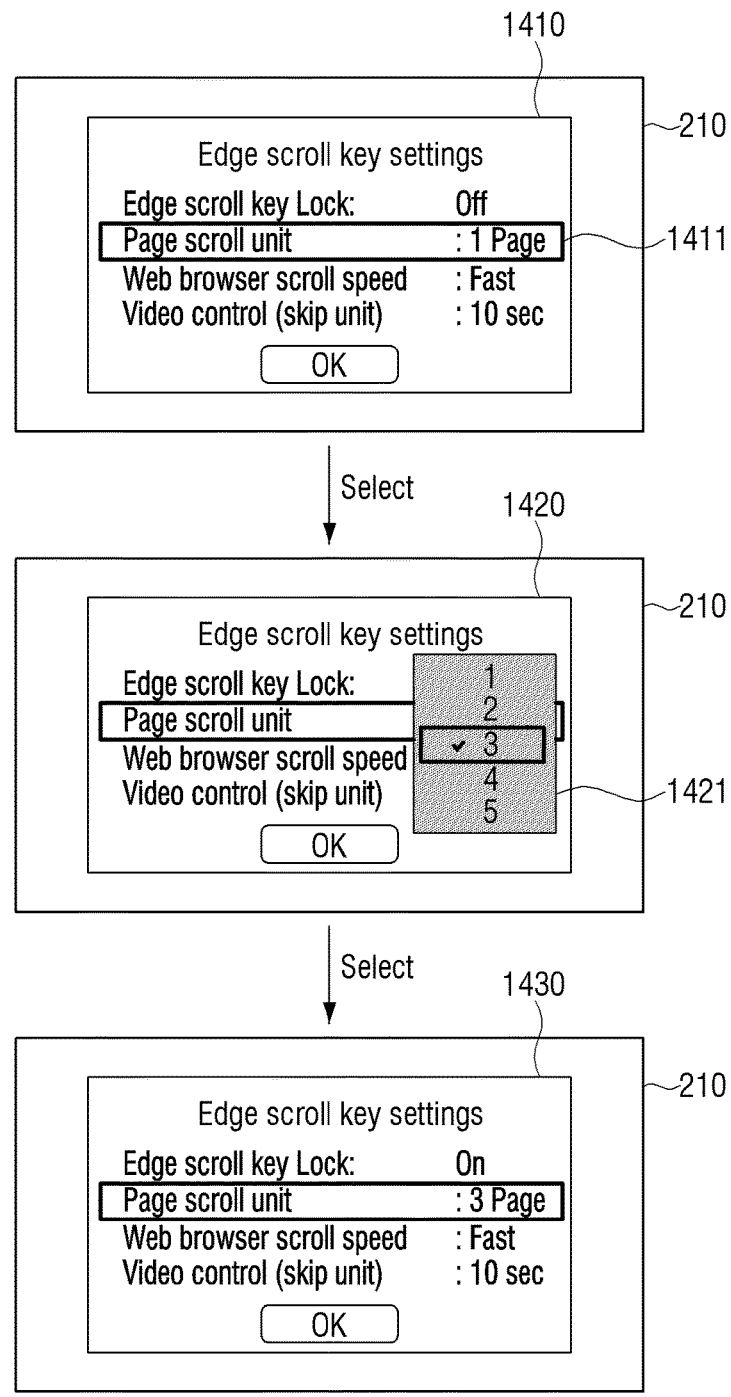

Referring to FIG. 14, the user may set a page unit for searching an item list based on manipulation of a plurality of keys of the second input 122.

Specifically, as illustrated in FIG. 14, while a set UI screen 1410 indicating setting to 1-page unit is being displayed on the display 210, when the user selects a page unit item 1411 through the first input 121 of the remote control apparatus 100, a set UI screen 1420 including a popup window 1421 to set a page unit is displayed. Then when the user selects '3' as a page unit, a set UI screen 1430 indicating setting by 3-page unit is displayed on the set UI screen 1430.

For example, when setting is by 3-page unit, while the item list is being displayed on the display 210, as the user selects the third key 122c of the second input 122, the item list is turned by 3-page unit in the downward direction. That is, when 1 page includes 5 items, for example, then items are turned by the unit of 15 items.

Figure 15:
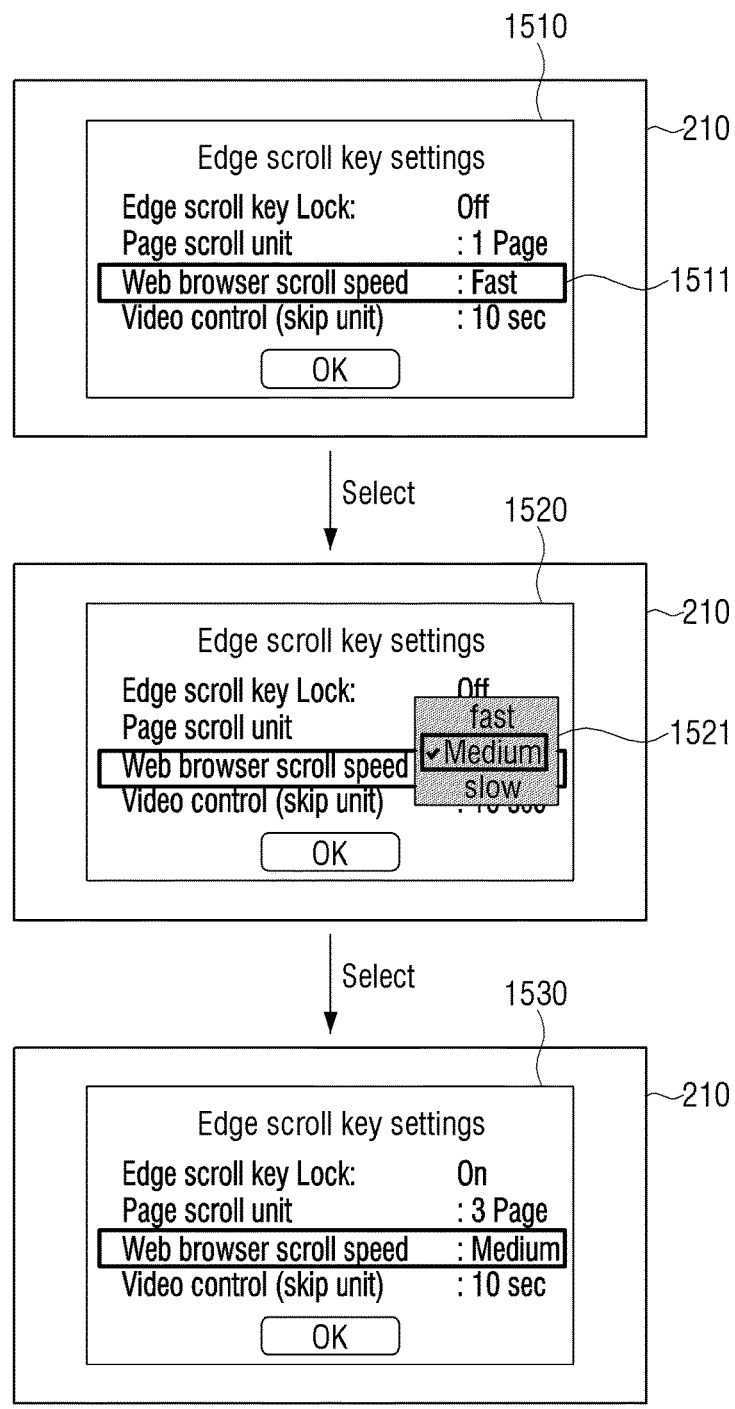

Referring to FIG. 15, the user is able to set a scroll distance unit with a manipulation of a plurality of keys of the second input 122. FIG. 15 illustrates the scroll distance unit based on the scroll speed. That is, when the scroll speed is set to 'slow', the scroll distance unit would be relatively short, thus enabling accurate scroll, when the scroll speed is set to 'fast', the scroll distance unit would be relatively long, thus enabling scrolling down to the bottom of the screen with only one key manipulation, and when the scroll speed is set to 'medium', the scroll distance would correspond to approximately intermediate scroll distance.

Specifically, as illustrated in FIG. 15, while a set UI screen 1510, indicating that the scroll speed is set to 'fast', is being displayed on the display 210, when the user selects a scroll speed item 1511 through the first input 121 of the remote control apparatus 100, a set UI screen 1520 including a popup window 1521 that can set a scroll distance unit, is displayed. Then when the user selects 'medium' for the scroll speed, a set UI screen 1530 indicating that the scroll speed is set to 'medium', is displayed.

For example, when the scroll distance unit, i.e., when the scroll speed is set to 'fast', and while a scrollable object is being displayed on the display 210, when the user selects the third key 122c of the second input 122, the bottom portion of the scrollable object is displayed on the display 210.

Figure 16:
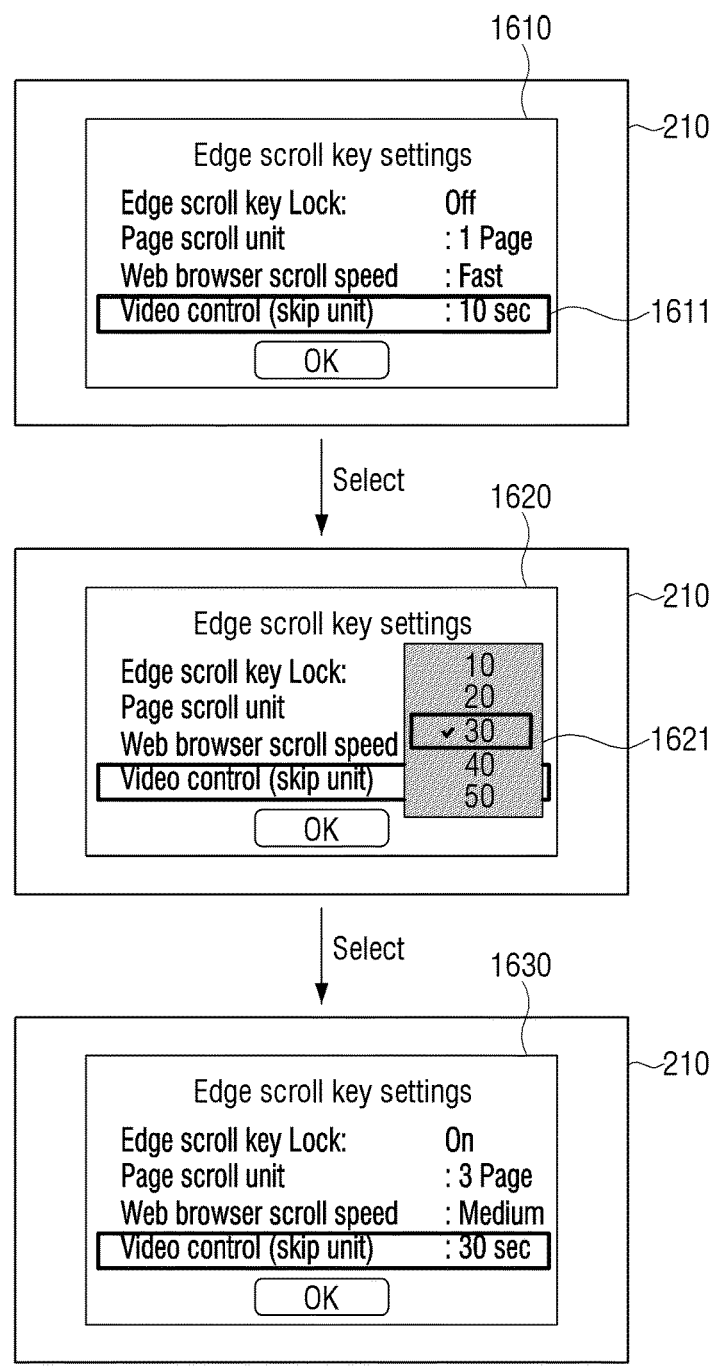

Referring to FIG. 16, the user may set a content skip time unit with a manipulation of a plurality of keys of the second input 122.

Specifically, as illustrated in FIG. 16, while a set UI screen 1610 indicating that the time unit is set to 10 seconds is being displayed on the display 210, when the user selects a skip time unit item 1611 through the first input 121 of the remote control apparatus 100, a set UI screen 1620 including a popup window 1621 to set the time unit to skip the content is displayed. Then when the user selects '30 seconds as the time unit, a set UI screen 1639 indicating that the time unit is set by '30 seconds' is displayed.

For example, when the time unit is set to '30 seconds', in response to selection of the fourth key 122d of the second input 122 by the user while the content playing screen is being displayed on the display 210, a play screen, which is skipped 30 seconds backward from the currently-played screen, is displayed on the display 210.

According to the exemplary embodiments described above, the user is provided with an effect that he or she is able to search an item list, scroll an object, or skip the time of playing content, as desired.

Meanwhile, various exemplary embodiments described above may be implemented on a recording medium readable by a computer or a similar device, using software, hardware, or a combination thereof. The hardware level implementation of the exemplary embodiments described herein may include use of at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for preforming functions. In some implementations, the exemplary embodiments described herein may be the processor 130 itself. According to the software level implementation, the exemplary embodiments regarding the procedures, functions, and so on described herein may be implemented as separate software modules. Each of the software modules may perform one or more functions and operations that are described herein.

Figure 17:
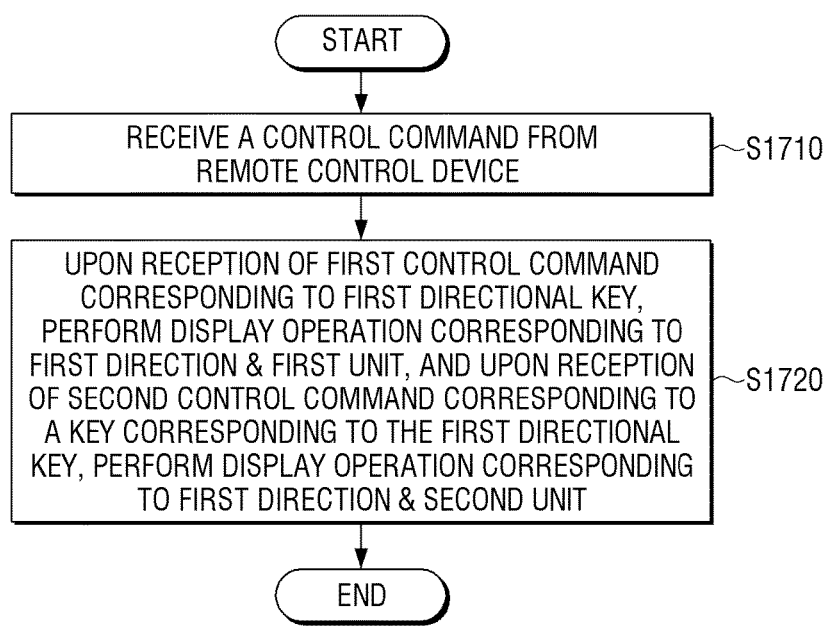
FIG. 17 is a flowchart provided to explain a method for controlling a display apparatus according to an exemplary embodiment of the present disclosure.

FIG. 17 is a flowchart provided to explain a method for controlling of a display apparatus 200 that is capable of communicating with a remote control apparatus having a plurality of direction keys and a plurality of keys corresponding to a plurality of direction keys.

Referring to FIG. 17, first, the display apparatus 200 receives a control command from the remote control apparatus 100 at S1710.

In response to receiving a first control command corresponding to the first direction key among a plurality of direction keys of the remote control apparatus 100, the display apparatus 200 performs a display operation corresponding to the first direction and the first unit, and in response to receiving a second control command corresponding to a key corresponding to the first direction key among a plurality of keys, the display apparatus 200 performs a display operation corresponding to the first direction and the second unit that is greater than the first unit at S1720.

In the above example, when an item list is being displayed on the display apparatus 200, the display apparatus 200 may search the item list in the first direction by the item unit in response to receiving the first control command described above, or search the item list in the first direction and by a page unit including a plurality of items in response to the second control command described above.

Meanwhile, when the content play screen is being displayed on the display apparatus 200, the display apparatus 200 may skip the content in a play direction corresponding to the first direction and by the first time unit in response to receiving the first control command described above, or skip the content in a play direction corresponding to the first direction and the second time unit greater than the first time unit in response to receiving the second control command.

Meanwhile, when a scrollable object is being displayed on the display apparatus 200, the display apparatus 200 may scroll the object in the first direction and by the first length unit in response to receiving the first control command described above, or scroll the object in the first direction and by the second length unit greater than the first length unit in response to receiving the second control command described above.

Meanwhile, when the content is being displayed on the display apparatus 200, in response to receiving a control command corresponding to a rotation input from the remote control apparatus, the display apparatus 200 may move the time of playing content forward and backward according to a direction of rotation of the rotation input. Further, while the time of playing content is being moved forward or backward, the display apparatus 200 may temporarily pause playing the content when the reception of a control command corresponding to the rotation input from the remote control apparatus 100 is stopped.

Meanwhile, the methods according to various exemplary embodiments of the present disclosure may be generated as software and loaded on an electronic apparatus.

In one example, a non-transitory computer readable medium may be provided, storing therein a program to perform operations of performing a display operation corresponding to the first direction and the first unit in response to receiving the first control command corresponding to the first direction key among a plurality of direction keys, and performing a display operation corresponding to the first direction and the second unit greater than the first unit, in response to receiving the second control command corresponding to a key core to the first direction key among a plurality of keys of the remote control apparatus.

The non-transitory computer readable medium refers to a medium that is capable of storing data semi-permanently rather than a medium that stores data for brief time, such as register, cache, memory, and so on, and that is readable by machines. Specifically, the various applications or programs described above may be stored on a non-transitory computer readable medium such as CD, DVD, hard disk, bluray disk, USB, memory card, ROM, and so on and provided.

The computer readable recording medium may include hard disc, floppy disc, magnetic media (e.g., magnetic tape), optical media (e.g., compact disc read only memory (CD-ROM), digital versatile disc (DVD), magneto-optical media (e.g., floptical disc)), and hardware device (e.g., ROM, RAM, or flash memory). Further, the program commands may include high language codes that can be performed by a computer using the interpreter as well as mechanical codes created by a compiler. The above described hardware device may be constituted to operate as one or more software module in order to perform operation of the various embodiments, and vice versa.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A remote control apparatus, comprising:
    a communicator;
    a first interface comprising a plurality of direction keys;
    a second interface disposed on an edge of the first interface and comprising a plurality of keys corresponding to the plurality of direction keys; and
    a processor configured to:
    in response to selection of a first direction key among the plurality of direction keys of the first interface while a display apparatus is playing a content, control the communicator to transmit a first control command to skip the content in a play direction corresponding to a first direction by a first time unit, and
    in response to selection of a key corresponding to the first direction key among the plurality of keys of the second interface while the display apparatus is playing the content, control the communicator to transmit a second control command to skip the content in a play direction corresponding to the first direction by a second time unit greater than the first time unit.

2. The remote control apparatus of claim 1, wherein the processor is further configured to:
    in response to selection of the first direction key while an item list is being displayed on the display apparatus, control the communicator to transmit a control command to search the item list in a first direction by an item unit, and in response to selection of the key corresponding to the first direction key among the plurality of keys of the second interface while the item list is being displayed on the display apparatus, control the communicator to transmit a control command to search the item list in the first direction and by a page unit including a plurality of items.

3. The remote control apparatus of claim 1, wherein, the processor is further configured to:
in response to selection of the first direction key while a scrollable object is being displayed on the display apparatus, control the communicator to transmit a control command to scroll the object in a first direction by a first length unit, and
in response to selection of the key corresponding to the first direction key among the plurality of keys of the second interface while the scrollable object is being displayed on the display apparatus, control the communicator to transmit a control command to scroll the object in the first direction and by a second length unit greater than the first length unit.

4. The remote control apparatus of claim 1, wherein the first interface is disposed inside an area where the second interface is disposed, and
the plurality of direction keys are disposed at a location corresponding to a location of the plurality of keys.

5. The remote control apparatus of claim 1, wherein the second interface receives a rotation input, and a press input corresponding to the plurality of keys, and
the processor controls the communicator to transmit to the display apparatus a third control command to perform a function corresponding to a direction of rotation of the rotation input received through the second interface.

6. The remote control apparatus of claim 5, wherein, when a content is being played on the display apparatus,
the third control command is a control command to move a time of playing content forward or backward according to the direction of rotation of the received rotation input.

7. The remote control apparatus of claim 6, wherein, when a reception of the rotation input is stopped, the processor controls the communicator to transmit to the display apparatus a control command to temporarily pause playing the content.

8. The remote control apparatus of claim 5, wherein, when an item list is being displayed on the display apparatus,
the third control command is a control command to search the item list in a direction corresponding to the direction of rotation of the received rotation input.

9. The remote control apparatus of claim 5, wherein, when a scrollable object is being displayed on the display apparatus,
the third control command is a control command to scroll the object in a direction corresponding to the direction of rotation of the received rotation input.

10. The remote control apparatus of claim 1, wherein the second interface is formed as a touchpad or a rotatable member.

11. A method for controlling of a remote control apparatus comprising a first interface comprising a plurality of direction keys, and a second interface disposed on an edge of the first interface and comprising a plurality of keys corresponding to the plurality of direction keys, the method comprising:
in response to selection of a first direction key among the plurality of direction keys of the first interface while a display apparatus is playing a content, transmitting a first control command to skip the content in a play direction corresponding to a first direction by a first time unit; and
in response to selection of a key corresponding to the first direction key among the plurality of keys of the second interface while the display apparatus is playing the content, transmitting a second control command to skip the content in a play direction corresponding to the first direction by a second time unit greater than the first time unit.

12. The method of claim 11, further comprising:
in response to selection of the first direction key while an item list is being displayed on the display apparatus, transmitting a control command to search the item list in a first direction by an item unit; and
in response to selection of the key corresponding to the first direction key among the plurality of keys of the second interface while the item list is being displayed on the display apparatus, transmitting a control command to search the item list in the first direction and by a page unit including a plurality of items.

13. The method of claim 11, further comprising:
in response to selection of the first direction key while a scrollable object is being displayed on the display apparatus, transmitting a control command to scroll the object in a first direction by a first length unit; and
in response to selection of the key corresponding to the first direction key among the plurality of keys of the second interface while the scrollable: object is being displayed on the display apparatus, transmitting a control command to scroll the object in the first direction and by a second length unit greater than the first length unit.

14. The method of claim 11, further comprising:
receiving a rotation input through the second interface; and
transmitting to the display apparatus a third control command to perform a function corresponding to a direction of rotation of the received rotation input.

15. The method of claim 14, wherein, when a content is being played on the display apparatus,
the third control command is a control command to move a time of playing content forward or backward according to the direction of rotation of the received rotation input.

16. The method of claim 15, wherein, when a reception of the rotation input is stopped, further comprising transmitting to the display apparatus a control command to temporarily pause playing the content.

17. The method of claim 14, wherein, when an item list is being displayed on the display apparatus,
the third control command is a control command to search the item list in a direction corresponding to the direction of rotation of the received rotation input.

18. A display system, comprising:
a remote control apparatus comprising a first interface comprising a plurality of direction keys, and a second interface disposed on an edge of the first interface and comprising a plurality of keys corresponding to the plurality of direction keys; and
a display apparatus configured to:
in response to selection of a first direction key among the plurality of direction keys of the first interface while the display apparatus is playing a content, skip the content in a play direction corresponding to a first direction by a first time unit, and in response to selection of a key corresponding to the first direction key among the plurality of keys of the second interface while the display apparatus is playing the content, skip the content in a play direction corresponding to the first direction by a second time unit greater than the first time unit.

* * * * *